(12) United States Patent
Sasaki et al.

(10) Patent No.: US 10,690,138 B2
(45) Date of Patent: Jun. 23, 2020

(54) MOTOR CONTROL DEVICE, MOTOR CONTROL METHOD, AND BLOWER APPARATUS

(71) Applicant: Panasonic Intellectual Property Management Co., Ltd., Osaka-shi, Osaka (JP)

(72) Inventors: Ryuta Sasaki, Osaka (JP); Yasuyuki Yokouchi, Osaka (JP); Yasushi Kato, Kyoto (JP)

(73) Assignee: Panasonic Intellectual Property Management Co., LTD, Osaka (JP)

( * ) Notice: Subject to any disclaimer, the term of this patent is extended or adjusted under 35 U.S.C. 154(b) by 1149 days.

(21) Appl. No.: 14/420,456

(22) PCT Filed: May 10, 2013

(86) PCT No.: PCT/JP2013/003019
§ 371 (c)(1),
(2) Date: Feb. 9, 2015

(87) PCT Pub. No.: WO2014/024360
PCT Pub. Date: Feb. 13, 2014

(65) Prior Publication Data
US 2015/0233380 A1 Aug. 20, 2015

(30) Foreign Application Priority Data
Aug. 9, 2012 (JP) .................... 2012-177142

(51) Int. Cl.
*F04D 27/00* (2006.01)
*H02P 23/00* (2016.01)
(Continued)

(52) U.S. Cl.
CPC ............ *F04D 27/004* (2013.01); *F24F 11/77* (2018.01); *H02P 23/0004* (2013.01);
(Continued)

(58) Field of Classification Search
None
See application file for complete search history.

(56) References Cited

U.S. PATENT DOCUMENTS 4,108,574 A * 8/1978 Bartley ..................... G01F 1/00
417/19
4,467,706 A * 8/1984 Batcheller ............ B01D 50/002
165/244
(Continued)

FOREIGN PATENT DOCUMENTS

CN 101233325 A 7/2008
CN 101672509 A 3/2010
(Continued)

OTHER PUBLICATIONS

Esfandiari, Ramin. Numerical Methods for Engineers and Scientists Using MATLAB (2nd Edition, Ch 5, pp. 161-248) : Taylor & Francis. (Year: 2017).*
(Continued)

*Primary Examiner* — Essama Omgba
*Assistant Examiner* — Geoffrey S Lee
(74) *Attorney, Agent, or Firm* — Brinks Gilson & Lione

(57) ABSTRACT

A motor control device which controls a motor for driving a blower unit, comprises: a target motor output calculating section which calculates a target motor output which causes an air flow of air supplied from the blower unit to coincide with a target air flow; and an operation command generating section which obtains the motor output of the motor, and generates a command for controlling a physical amount of the motor such that the motor output coincides with the target motor output based on a result of comparison between the motor output and the target motor output; and the target motor output calculating section is configured to calculate the target motor output as a product of a polynomial of (Continued)

variables derived by dividing the target air flow by the motor speed, and a cube of the motor speed.

26 Claims, 12 Drawing Sheets

(51) Int. Cl.
  *H02P 23/30* (2016.01)
  *H02P 29/40* (2016.01)
  *H02P 23/14* (2006.01)
  *F24F 11/77* (2018.01)

(52) U.S. Cl.
  CPC .............. *H02P 23/14* (2013.01); *H02P 23/30* (2016.02); *H02P 29/40* (2016.02)

(56) References Cited

U.S. PATENT DOCUMENTS

| | | | | |
|---|---|---|---|---|
| 5,240,380 A * | 8/1993 | Mabe | .............. | F04D 15/0066 417/43 |
| 5,447,414 A * | 9/1995 | Nordby | .............. | F04D 27/00 417/20 |
| 5,736,823 A * | 4/1998 | Nordby | .............. | G05D 7/0676 318/432 |
| 6,260,004 B1 * | 7/2001 | Hays | .............. | G05B 23/0235 702/130 |
| 6,353,299 B1 * | 3/2002 | Ramachandran | ..... | F04D 27/004 318/432 |
| 6,353,302 B1 * | 3/2002 | Ramachandran | ..... | F04D 27/004 318/432 |
| 6,353,303 B1 * | 3/2002 | Ramachandran | ..... | F04D 27/004 318/432 |
| 6,354,805 B1 * | 3/2002 | Møller | .............. | F04B 49/065 318/473 |
| 6,462,494 B1 * | 10/2002 | Schone | .............. | F04D 27/004 318/433 |
| 6,504,338 B1 * | 1/2003 | Eichorn | .............. | G05D 7/0676 236/DIG. 9 |
| 6,564,627 B1 * | 5/2003 | Sabini | .............. | F04D 15/0088 417/19 |
| 6,591,697 B2 * | 7/2003 | Henyan | .............. | G01F 1/28 73/861.71 |
| 6,715,996 B2 * | 4/2004 | Moeller | .............. | F04D 15/0066 417/423.1 |
| 7,945,411 B2 * | 5/2011 | Kernan | .............. | F04D 15/0088 702/100 |
| 8,408,878 B2 * | 4/2013 | Shahi | .............. | F04D 27/004 417/1 |
| 8,729,847 B2 * | 5/2014 | Gallegos-Lopez | ..... | H02P 21/22 318/432 |
| 9,027,398 B2 * | 5/2015 | Ahonen | .............. | F04D 15/0272 73/168 |
| 9,611,856 B2 * | 4/2017 | Cheng | .............. | F04D 15/0066 |
| 2001/0041139 A1 * | 11/2001 | Sabini | .............. | F04D 15/0066 417/18 |
| 2003/0064676 A1 * | 4/2003 | Federspiel | .............. | B61D 27/00 454/75 |
| 2003/0129062 A1 * | 7/2003 | Sabini | .............. | F04D 15/0088 417/22 |
| 2003/0133808 A1 * | 7/2003 | Sabini | .............. | F04D 15/0088 417/53 |
| 2003/0235492 A1 * | 12/2003 | Mirsky | .............. | F04D 15/029 415/1 |
| 2004/0064292 A1 * | 4/2004 | Beck | .............. | E21B 43/126 702/182 |
| 2004/0120804 A1 * | 6/2004 | Sabini | .............. | F04D 15/0088 415/118 |
| 2004/0135534 A1 * | 7/2004 | Cullen | .............. | G05B 17/02 318/609 |
| 2005/0031443 A1 * | 2/2005 | Ohlsson | .............. | F04D 15/0088 415/30 |
| 2007/0065690 A1 * | 3/2007 | Schaefer | .............. | F04D 27/001 429/434 |
| 2007/0212210 A1 * | 9/2007 | Kernan | .............. | F04D 27/001 415/1 |
| 2007/0212229 A1 * | 9/2007 | Stavale | .............. | F04D 15/0088 417/42 |
| 2008/0246426 A1 * | 10/2008 | Aoki | .............. | H02P 23/0004 318/461 |
| 2008/0288115 A1 * | 11/2008 | Rusnak | .............. | F04D 15/0066 700/282 |
| 2009/0104034 A1 * | 4/2009 | Takada | .............. | H02P 6/085 416/61 |
| 2009/0129017 A1 | 5/2009 | Takada | | |
| 2009/0308941 A1 * | 12/2009 | Patch | .............. | F24F 11/0001 236/49.3 |
| 2010/0076606 A1 * | 3/2010 | Gatley | .............. | F04D 27/004 700/276 |
| 2010/0101265 A1 * | 4/2010 | Yokouchi | .............. | F04D 27/004 62/426 |
| 2010/0253249 A1 * | 10/2010 | Gutmann | .............. | F04D 27/004 318/3 |
| 2011/0046790 A1 * | 2/2011 | Miller | .............. | G05B 19/042 700/276 |
| 2011/0050137 A1 * | 3/2011 | Imura | .............. | H02P 21/0003 318/400.15 |
| 2011/0169436 A1 * | 7/2011 | Takahashi | .............. | H02P 23/14 318/400.3 |
| 2011/0241584 A1 * | 10/2011 | He | .............. | H02P 6/08 318/400.09 |
| 2011/0301766 A1 * | 12/2011 | Higgins | .............. | G06Q 10/06 700/282 |
| 2012/0010754 A1 * | 1/2012 | Matteson | .............. | H05K 7/20836 700/282 |
| 2012/0044644 A1 * | 2/2012 | Harlan | .............. | F04D 25/166 361/695 |
| 2012/0059635 A1 * | 3/2012 | Ebisawa | .............. | F04D 27/001 703/2 |
| 2012/0217923 A1 * | 8/2012 | Wu | .............. | H02P 21/0003 318/610 |
| 2012/0247200 A1 * | 10/2012 | Ahonen | .............. | F04D 15/0272 73/168 |
| 2012/0251292 A1 * | 10/2012 | Tamminen | .............. | F04D 27/001 415/1 |
| 2012/0251340 A1 * | 10/2012 | Ahonen | .............. | F04D 15/0088 417/53 |
| 2013/0015251 A1 * | 1/2013 | Bloemendaal | .......... | A01F 25/22 236/49.3 |
| 2014/0288716 A1 * | 9/2014 | Cheng | .............. | F04D 15/0066 700/282 |
| 2015/0086382 A1 * | 3/2015 | Tamminen | .............. | F24D 19/1012 417/29 |
| 2015/0233380 A1 * | 8/2015 | Sasaki | .............. | F04D 27/004 417/44.1 |

FOREIGN PATENT DOCUMENTS

| | | |
|---|---|---|
| JP | 8-140390 A | 5/1996 |
| JP | 2003-143887 A | 5/2003 |
| JP | 2006-214601 A | 8/2006 |
| WO | WO 2008/117515 A1 | 10/2008 |

OTHER PUBLICATIONS

International Search Report in corresponding International Application No. PCT/JP2013/003019, dated Jul. 2, 2013, 2 pages.

Office Action and English language translation of Search Report, in corresponding Chinese Application No. 201380041251.8, dated Aug. 2, 2016, 5 pages.

* cited by examiner

MOTOR CONTROL DEVICE, MOTOR CONTROL METHOD, AND BLOWER APPARATUS

This application is a 371 application of PCT/JP2013/003019 having an international filing date of May 10, 2013, which claims priority to JP2012-177142 filed Aug. 9, 2012, the entire contents of which are incorporated herein by reference.

TECHNICAL FIELD

The present invention relates to a motor control device, a motor control method, and a blower apparatus. Particularly, the present invention relates to an air flow (air volume) control method of a blower unit in an air conditioning system which performs ventilation or cooling and heating.

BACKGROUND ART

In an air conditioning system which performs ventilation or cooling and heating, especially in an air conditioning system which supplies air from one blower unit to one or a plurality of rooms via duct(s), a condition (hereinafter will be referred to as "pressure loss condition") which determines a pressure loss in the air conditioning system, is different, depending on the installed state or use state of an air conditioning apparatus including the blower unit. For example, the pressure loss condition is different depending on a difference in the shape or length of the duct(s) connected to the air conditioning apparatus. Also, due to clogging of a filter attached to the outlet port or suction port of the air conditioning apparatus, the pressure loss condition changes with a passage of time. Due to the difference or change in the pressure loss condition with a passage of time, a static pressure required to obtain a specified air flow also changes. For this reason, even when a plurality of air conditioning apparatus of the same specification are driven at equal torque or an equal rotational speed, the resulting air flows (air volumes) may be sometimes non-uniform. Or, even when a particular air conditioning apparatus is driven at constant torque or a constant rotational speed, its air flow cannot be maintained at a constant value. Under the circumstances, in recent years, it is required that the air flow be controlled to be maintained at a target air flow, when the pressure loss condition or the static pressure changes.

As a technique for realizing the constant air flow control, for example, there is a method which uses a pressure sensor. However, this method has a problem that the pressure sensor is not easily installed or a reliability is low in long-time use. To solve this, study has been conducted for various methods which utilize a characteristic (hereinafter will be referred to as "blower characteristic") unique to the blower unit, which is necessary for the constant air flow control without using the pressure sensor. In this method, prior to operation (running) under the constant air flow control, a measurement experiment which measures the relation between the physical amounts (motor speed, motor torque, etc.) of a motor of the blower unit, and the air flow, is conducted preliminarily. By utilizing the blower characteristics obtained in this measurement experiment, the constant air flow control is performed.

As such a technique of the constant air flow control, for example, Patent Literature 1 is known. According to the prior art disclosed in Patent Literature 1, the command speed of the motor which drives the blower unit is calculated according to the following formula (1):

$$S^* = S + K \times (S - Sa) \quad (1)$$

S* indicates the command speed of the motor, S indicates a motor speed, Sa indicates a target motor speed, and K indicates a gain. The target motor speed Sa is calculated from the following formula (2):

$$Sa = \sum_{n=0}^{j}\left(\sum_{m=0}^{i}(k_{nm}T^n Q^{*m})\right) \quad (2)$$

T indicates motor torque, Q* indicates a target air flow, $k_{nm}$ (n=0, 1, 2, ..., j, m=0, 1, 2, ..., i) indicates a constant, i indicates a finite value, and j indicates a finite value. The formula (2) represents a relation in which the motor speed required to allow the air flow to become the target air flow Q* in a case where the motor torque is T is Sa.

The constant $k_{nm}$ is a coefficient unique to the blower unit, and is derived by conducting the measurement experiment preliminarily. In this measurement experiment, initially, the blower unit is connected to wind tunnel experiment equipment, and the motor torque and the air flow are measured while changing the motor speed under different static pressures. Then, the value of the constant $k_{nm}$ is calculated using a least square method so that the formula (2) becomes a regression formula which satisfies this measurement data on average.

The motor control device disclosed in Patent Literature 1 implements the constant air flow control by performing the speed control in such a manner that the command speed S* is calculated according to the formula (2) to which the constant $k_{nm}$ derived t preliminarily by the measurement experiment is applied and the formula (1), and the motor speed S tracks the command speed S*, in the manner as described above.

CITATION LIST

Patent Literature

Patent Literature 1: International Publication No. 2008/117515

SUMMARY OF INVENTION

Technical Problem

In the prior art disclosed in Patent Literature 1, the accuracy degree to which the air flow coincides with the target air flow during the constant air flow control depends on the accuracy degree to which the formula (2) can regress the actual blower characteristic of the blower unit. In brief, the accuracy degree to which the air flow coincides with the target air flow depends on the accuracy degree of the constant $k_{nm}$. If the constant $k_{nm}$ containing an error is applied to the formula (2), the motor is controlled based on incorrect blower characteristic. This results in an air flow error. As a result, a desired target air flow cannot be obtained.

The accuracy degree of the constant $k_{nm}$ is significantly affected by the regression error in the case where the formula (2) which is the regression formula is derived from the obtained measurement data. To lessen the regression error, it becomes necessary to conduct the measurement experiment while ensuring adequate measurement data in number and an adequate measurement range. This is because if the measurement data is less in number, the blower characteristic between the measurement data and the measurement data cannot be regressed accurately, while if the measurement range is not adequate, the blower characteristic outside the measurement range cannot be regressed accurately.

In the prior art disclosed in Patent Literature 1, to ensure an adequate measurement range, it is necessary to change both of the static pressure and the motor speed over an entire actual use range. In other words, it is necessary to perform the measurement while changing the static pressure in the wind tunnel experiment equipment over the entire changing magnitude of the static pressure which is assumed during the operation under the constant air flow control and changing the motor speed over an entire motor speed range used during the operation under the constant air flow control. Thus, it is necessary to calculate much data, and as a result, many experiment steps are required.

The present invention is directed to solving the above described problem associated with the prior art, and an object of the present invention is to provide a motor control device, a motor control method, and a blower apparatus, which are capable of performing the constant air flow control, with a high accuracy, with fewer experiment steps, and irrespective of a change in the pressure loss condition or a change in the static pressure.

Solution to Problem

To solve the above described object, according to an aspect of the present invention, there is provided a motor control device which controls a motor for driving a blower unit, comprising: a target motor output calculating section which obtains a motor speed of the motor and calculates a target motor output which causes an air flow of air supplied from the blower unit to coincide with a target air flow, based on the target air flow and the motor speed; and an operation command generating section which obtains a motor output of the motor, and generates an operation command for controlling a physical amount of the motor such that the motor output coincides with the target motor output, based on a result of comparison between the motor output and the target motor output; wherein the target motor output calculating section is configured to calculate the target motor output as a product of a polynomial of variables derived by dividing the target air flow by the motor speed, and a cube of the motor speed.

In accordance with this configuration, since the motor can be controlled while automatically searching the motor output which can attain the target air flow, the constant air flow control can be performed even when the pressure loss condition or the static pressure changes. In addition, since the target motor output is derived as a product of a polynomial of variables derived by dividing the target air flow by the motor speed, and the cube of the motor speed, it becomes possible to implement the constant air flow control with a high accuracy, with fewer experiment steps, and irrespective of a change in the pressure loss condition or a change in the static pressure.

According to another aspect of the present invention, there is provided method of controlling a motor for driving a blower unit, the method comprising: a first step of obtaining a motor speed of the motor and calculating a target motor output which causes an air flow of air supplied from the blower unit to coincide with a target air flow, based on the target air flow and the motor speed; and a second step of generating an operation command for controlling a physical amount of the motor such that the motor output coincides with the target motor output, based on a result of comparison between the motor output and the target motor output; wherein in the first step, the target motor output is calculated as a product of a polynomial of variables derived by dividing the target air flow by the motor speed, and a cube of the motor speed.

In accordance with this method, since the motor can be controlled while automatically searching the motor output which can attain the target air flow, the constant air flow control can be performed even when the pressure loss condition or the static pressure changes. In addition, since the target motor output is derived as a product of a polynomial of variables derived by dividing the target air flow by the motor speed, and the cube of the motor speed, it becomes possible to implement the constant air flow control with a high accuracy, with fewer experiment steps, and irrespective of the change in the pressure loss condition or the change in the static pressure.

According to another aspect of the present invention, there is provided a blower apparatus including a blower unit; a motor which drives the blower unit; and a motor control device which controls driving of the motor, the motor control device comprising the above described configuration.

The above and further objects, features and advantages of the invention will more fully be apparent from the following detailed description with reference to the accompanying drawings.

Advantageous Effects of Invention

The present invention is configured as described above, and has an advantage that it becomes possible to implement constant air flow control with a high accuracy, with fewer experiment steps, and irrespective of a change in a pressure loss condition or a change in a static pressure.

DETAILED DESCRIPTION OF THE PREFERRED EMBODIMENTS

Outline of the Present Invention

Figure 1:
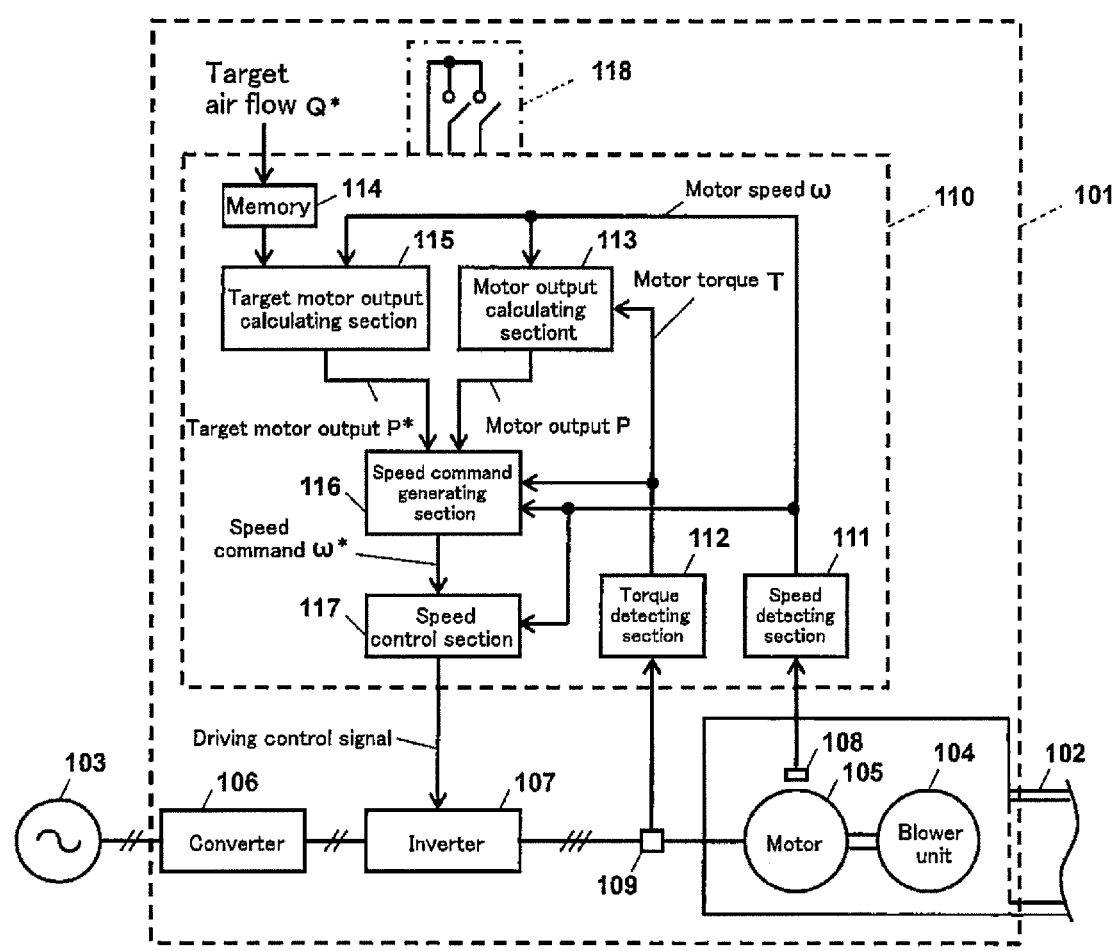
FIG. 1 is a block diagram showing an air conditioning apparatus to which a motor control device according to Embodiment 1 of the present invention is applied.

Initially, the outline of the present invention will be described. As described above, in the method of performing the constant air flow control, the measurement experiment for deriving the blower characteristic (relation between physical amounts of motor and air flow) which is unique to the blower unit, which is necessary for the constant air flow control, is conducted preliminarily for each blower unit, in the conventional motor control device. In the conventional configuration, the measurement experiment is conducted according to the above stated formula (2), and therefore, the relation between the physical amounts of motor and the air flow is not unique. For this reason, in the measurement experiment, it is necessary to change both of the static pressure relating to the air flow and the motor speed which is the physical amount of the motor, over the entire actual use range. In other words, it is necessary to change the static pressure in the wind tunnel experiment equipment over the entire changing magnitude of the static pressure which is assumed during the operation under the constant air flow control and to change the motor speed over an entire motor speed range used during the operation under the constant air flow control. Thus, many experiment steps are required, and the coefficients obtained from the measurement experiment are approximate values. As a result, it is difficult to improve the accuracy.

In view of the above stated problem, the inventors of the present invention studied intensively. As a result, the inventors attained the finding that the relation between the physical amounts of the motor and the air flow can be made unique by applying the concept of similarity of flows to the motor control device. Specifically, by utilizing the fact that in the similarity of flows, the motor output is proportional to the cube of the motor speed, and the air flow is proportional to the motor speed, the constant air flow control is performed by using the target motor output calculated as a product of a polynomial of variables derived by dividing a target air flow by the motor speed and the cube of the motor speed. By using the formula in which the relation between the motor speed and the motor output, and the air flow, is unique, in this way, the values of the blower coefficients which are applicable to every motor speed can be derived once the data measurement is performed using one motor speed. This makes it possible to implement the constant air flow control with a high accuracy, with fewer experiment steps, and irrespective of a change in the pressure loss condition or a change in the static pressure.

Now, the formulas used to derive the target motor output utilized in the embodiments of the present invention will be described.

It is assumed that a particular blower unit is driven at one motor speed $\omega_s$ by a particular motor and the static pressure in an environment in which the blower unit is installed is changed while maintaining this motor speed $\omega_s$. It is also assumed that the relation between the motor output $P_s$, and the air flow $Q_s$ at this time is regressed to the following polynomial (3):

$$P_S = \sum_{n=0}^{i} (K_n \cdot Q_S^n) \quad (3)$$

i indicates a finite value of integer which is equal to or larger than 0 and indicates the order of the regression formula, and $K_n$, is a constant (n=0, 1, 2, . . . , i) indicating the coefficient.

In general, in the blower unit such as a fan and a blower, because of the similarity of flows, shaft power is proportional to the cube of the rotational speed of the blower unit, and the air flow is proportional to the rotational speed of the blower unit. This rule applies to general fluidic machines which are other than the blower unit. If the blower unit and the shaft of the motor are joined together without a deflection or detachment, it can be supposed that the shaft power of the blower unit is equal to the motor output and the rotational speed of the blower unit is equal to the motor speed. Therefore, because of the similarity of flows, the following formulas (4) and (5) are satisfied:

$$\frac{P}{P_S} = \left(\frac{\omega}{\omega_S}\right)^3 \quad (4)$$

$$\frac{Q}{Q_S} = \frac{\omega}{\omega_S} \quad (5)$$

The formula (4) and the formula (5) represent the relation in which when the motor speed of the motor for driving the blower unit is changed from $\omega_s$ into $\omega$, the motor output is changed from $P_s$ into P with a ratio of the cube of the change rate ($\omega/\omega_s$) of the motor speed, and the air flow is changed at the same time, from $Q_s$ into Q with a ratio that is equal to the change rate ($\omega/\omega_s$) of the motor speed. By applying the formula (4) and the formula (5) to the formula (3), the following formula (6) is derived:

$$P = \sum_{n=0}^{i} \left[K_n \cdot \left(\frac{\omega}{\omega_S}\right)^{3-n} \cdot Q^n\right] \quad (6)$$

P indicates the motor output, ω indicates the motor speed, Q indicates the air flow, and i indicates a finite value of integer which is equal to or larger than 0 and has an order which is equal to that of the formula (3), $K_n$ indicates a constant (n=0, 1, 2, . . . , i) which is equal to the coefficient of the formula (3), and $\omega_S$ indicates a particular motor speed used for deriving the formula (6).

The above formula (6) indicates the relation in which the motor output in a case where the air flow is Q with respect to an arbitrary motor speed ω, is P. When the air flow Q is replaced by a target air flow Q*, the motor output P is replaced by the target motor output P*, and the constant $K_n$ and the constant $\omega_s$ are replaced by $\alpha_n$ and $\beta$, respectively, the following formula (7) is derived:

$$P^* = \sum_{n=0}^{i} \left[ \alpha_n \cdot \left(\frac{\omega}{\beta}\right)^{3-n} \cdot Q^{*n} \right] \quad (7)$$

$\omega$ indicates the motor speed, $Q^*$ indicates the target air flow, i indicates a finite value of integer which is equal to or larger than 0, and $\alpha_n$ (n=0, 1, 2, . . . , i) and $\beta$ indicate constants, respectively.

In the above formula (7), the polynomial of variables derived by dividing the target air flow $Q^*$ by the motor speed $\omega$, corresponds to $(\alpha_n/\beta^{3-n}) \cdot (\omega^*/Q^*)^n$. When this polynomial is multiplied by $\omega^3$ which is the cube of the motor speed $\omega$, the formula (7) is derived.

As described above, by measuring the motor output and the air flow while driving the blower unit at one motor speed $\omega_S$, and regressing the measurement result to the formula (3), the values of the blower coefficients $\alpha_n$ and $\beta$ can be decided immediately from $\omega_S$ and $K_n$.

As should be understood from the above, according to an aspect of the present invention, there is provided a motor control device which controls a motor for driving a blower unit, comprising: a target motor output calculating section which obtains a motor speed of the motor and calculates a target motor output which causes an air flow of air supplied from the blower unit to coincide with a target air flow, based on the target air flow and the motor speed; and an operation command generating section which obtains a motor output of the motor, and generates an operation command for controlling a physical amount of the motor such that the motor output coincides with the target motor output, based on a result of comparison between the motor output and the target motor output; wherein the target motor output calculating section is configured to calculate the target motor output as a product of a polynomial of variables derived by dividing the target air flow by the motor speed, and a cube of the motor speed.

The target motor output calculating section may calculate the target motor output according to the above formula (7).

The motor control device may include a motor output calculating section which obtains a first detection signal indicating the motor speed and a second detection signal indicating motor torque, and calculates the motor output based on the first detection signal and the second detection signal.

The operation command generating section may be configured as a speed command generating section which generates a speed command indicating a value of the motor speed, as the operation command.

The operation command generating section may be configured as a torque command generating section which generates a torque command indicating a value of motor torque, as the operation command.

The speed command generating section may generate as the speed command a value derived by multiplying the motor speed by a cubic root of a ratio of the target motor output with respect to the motor output.

The torque command generating section may generate as the torque command a value derived by multiplying the motor torque by (⅔)-th power of a ratio of the target motor output with respect to the motor output.

The speed command generating section may generate the speed command by using a value derived by integrating a difference between the motor output and the target motor output.

The torque command generating section may generate the torque command by using a value derived by integrating a difference between the motor output and the target motor output.

The speed command generating section may generate the speed command by using a sum of the motor speed and a value derived by multiplying by a gain a difference between the motor output and the target motor output.

The torque command generating section may generate as the torque command by using a sum of the motor torque and a value derived by multiplying by a gain a difference between the motor output and the target motor output.

The motor control device may include a storage section for storing a maximum motor output, and the target motor output calculating section may output the target motor output such that the target motor output is limited to a value which is equal to or less than the maximum motor output.

The motor control device may include a storage section for storing a predetermined minimum motor speed and a predetermined maximum motor speed which is higher than the minimum motor speed, wherein the speed command generating section may limit the speed command to a value within a range between the minimum motor speed and the maximum motor speed.

The motor control device may include a storage section for storing predetermined minimum motor torque and predetermined maximum motor torque which is larger than the minimum motor torque, wherein the torque command generating section may limit the torque command to a value within a range between the minimum motor torque and the maximum motor torque.

The operation command generating section may output the operation command which is equal in value to the operation command previously output, in at least one of a case where a difference between the motor torque currently obtained and the motor torque previously obtained falls within a first predetermined range, a case where a difference between the motor output currently obtained and the motor output previously obtained falls within a second predetermined range, and a case where a difference between the motor output and the target motor output falls within a third predetermined range.

The torque command generating section may output the torque command which is equal in value to the torque command previously output, when a difference between the torque command and the motor torque falls within a fourth predetermined range.

The motor control device may include a speed control section which generates a signal for controlling a driving voltage supplied to the motor such that the motor speed coincides with the speed command.

The motor control device may include a torque control section which generates a signal for controlling a driving voltage supplied to the motor such that the motor torque coincides with the torque command.

The first detection signal indicating the motor speed may be output from a first detecting section for detecting the motor speed.

The second detection signal indicating the motor torque may be output from a second detecting section for detecting the motor torque or a current flowing through the motor.

The motor control device may include a memory for storing the target air flow.

The memory may store a plurality of air flow values, and the target motor output calculating section may select one of the plurality of air flow values as the target air flow.

The motor control device may include a switch which is operated manually, and may be configured to select one of the plurality of air flow values as the target air flow, by operation of the switch.

The motor control device may comprise a communication section which receives a signal used to select the target air flow from the plurality of air flow values.

The motor control device may comprise a communication section which receives a signal indicating the target air flow.

The motor control device may include a first unit including at least the target motor output calculating section and the operation command generating section, and a second unit including at least the speed control section or the torque control section, and the first unit and the second unit may perform data communication between them.

The first unit may transmit at least the operation command to the second unit by the data communication, and the second unit may transmit to the first unit the first detection signal and the second detection signal, by the data communication.

According to another aspect of the present invention, there is provided a method of controlling a motor for driving a blower unit, the method comprising: a first step of obtaining a motor speed of the motor and calculating a target motor output which causes an air flow of air supplied from the blower unit to coincide with a target air flow, based on the target air flow and the motor speed; and a second step of obtaining a motor output of the motor, and generating an operation command for controlling a physical amount of the motor such that the motor output coincides with the target motor output, based on a result of comparison between the motor output and the target motor output; wherein in the first step, the target motor output is calculated as a product of a polynomial of variables derived by dividing the target air flow by the motor speed, and a cube of the motor speed.

In the first step, the target motor output may be calculated according to the above formula (7).

The method of controlling the motor may comprise a third step of calculating the motor output, based on a first change amount indicating the motor speed and a second change amount indicating the motor torque.

The operation command may be a speed command indicating the motor speed.

The operation command may be a torque command indicating the motor torque.

In the second step, a value derived by multiplying the motor speed by a cubic root of a ratio of the target motor output with respect to the motor output, may be generated as the speed command.

In the second step, a value derived by multiplying the motor torque by (⅔)-th power of a ratio of the target motor output with respect to the motor output may be generated as the torque command.

In the second step, the speed command may be generated by using a value derived by integrating a difference between the motor output and the target motor output.

In the second step, the torque command may be generated by using a value derived by integrating a difference between the motor output and the target motor output.

In the second step, the speed command may be generated by using a sum of the motor speed and a value derived by multiplying by a gain a difference between the motor output and the target motor output.

In the second step, the torque command may be generated by using a sum of the motor torque and a value derived by multiplying by a gain a difference between the motor output and the target motor output.

In the first step, the target motor output may be output such that the target motor output is limited to a value which is equal to or less than a predetermined maximum motor output.

In the second step, the speed command may be output such that the speed command is limited to a value within a range between a predetermined minimum motor speed and a predetermined maximum motor speed which is higher than the minimum motor speed.

The method of controlling the motor may comprise storing predetermined minimum motor torque and predetermined maximum motor torque which is larger than the minimum motor torque, and in the second step, the torque command may be limited to a value within a range between the minimum motor torque and the maximum motor torque.

The method of controlling the motor may comprise a fourth step of setting the operation command such that the operation command is equal in value to the operation command previously output, in at least one of a case where a difference between the motor torque and the motor torque previously obtained falls outside a first predetermined range, a case where a difference between the motor output and the motor output previously obtained falls outside a second predetermined range, and a case where a difference between the motor output and the target motor output falls outside a third predetermined range.

The method of controlling the motor may comprise a fifth step of setting the torque command such that the torque command is equal in value to the torque command previously output, when a difference between the torque command and the motor torque falls within a fourth predetermined range.

The method of controlling the motor may comprise a sixth step of generating a signal for controlling a driving voltage supplied to the motor such that the motor speed coincides with the speed command.

The method of controlling the motor may comprise a seventh step of generating a signal for controlling a driving voltage supplied to the motor such that the motor torque coincides with the torque command.

The first change amount indicating the motor speed may be output from a first detecting section for detecting the motor speed.

The second change amount indicating the motor torque may be output from a second detecting section for detecting the motor torque or a current flowing through the motor.

The method of controlling the motor may comprise measuring the motor output and the air flow while driving the blower unit at one motor speed by the motor; deriving a coefficient of the polynomial by regressing or approximating the motor output to the polynomial relating to the air flow; calculating a value of a constant $\alpha_n$ such that the coefficient of the polynomial becomes a factor of the constant $\alpha_n$, and deciding the one motor speed used in measurement of the motor output and the air flow as a value of a constant $\beta$.

In the method of controlling the motor, the coefficient of the polynomial obtained by regressing or approximating the motor output to the polynomial relating to the air flow, may be decided as the value of the constant $\alpha_n$.

In the method of controlling the motor, a value obtained by multiplying by an integer power of a change rate of a dimension of the blower unit, the coefficient of the polynomial obtained by regressing or approximating the motor output to the polynomial relating to the air flow, may be decided as the value of the constant $\alpha_n$.

According to another aspect of the present invention, there is provided a blower apparatus including a blower unit; a motor which drives the blower unit; and a motor control device which controls driving of the motor, the motor control device comprising: a motor output calculating section which obtains a first detection signal indicating a motor speed and a second detection signal indicating motor torque and calculates a motor output, based on the motor speed and the motor torque; a target motor output calculating section which calculates a target motor output which causes an air flow of air supplied from the blower unit to coincide with a target air flow, based on the target air flow and the motor speed; a speed command generating section which generates a speed command for controlling the motor speed such that the motor output coincides with the target motor output, based on a result of comparison between the motor output and the target motor output; and a speed control section which generates a signal for controlling a driving voltage supplied to the motor such that the motor speed coincides with the speed command; wherein the target motor output calculating section is configured to calculate the target motor output as a product of a polynomial of variables derived by dividing the target air flow by the motor speed, and a cube of the motor speed.

According to another aspect of the present invention, there is provided a blower apparatus including a blower unit; a motor which drives the blower unit; and a motor control device which controls driving of the motor, the motor driving device comprising: a motor output calculating section which obtains a first detection signal indicating a motor speed and a second detection signal indicating motor torque and calculates a motor output, based on the motor speed and the motor torque; a target motor output calculating section which calculates a target motor output which causes an air flow of air supplied from the blower unit to coincide with a target air flow, based on the target air flow and the motor speed; a torque command generating section which generates a torque command for controlling the motor torque such that the motor output coincides with the target motor output, based on a result of comparison between the motor output and the target motor output; and a torque control section which generates a signal for controlling a driving voltage supplied to the motor such that the motor torque coincides with the torque command; wherein the target motor output calculating section is configured to calculate the target motor output as a product of a polynomial of variables derived by dividing the target air flow by the motor speed, and a cube of the motor speed.

The blower apparatus may be mounted in an air conditioning apparatus.

The air conditioning apparatus may be incorporated into one of a general home, a construction for business purpose, a construction for commercial use, a clean room, and air conditioning equipment for business purpose.

The air conditioning apparatus may be incorporated into one of a car, a bus, a railway vehicle, an aircraft, and a marine vessel.

Hereinafter, a motor control device and a motor control method according to the embodiments of the present invention will be described with reference to the drawings. The constant air flow control performed by the motor control device of the embodiments described below is intended to maintain an air flow at a target air flow, irrespective of a change in a pressure loss condition or a change in a static pressure. Regarding an example of calculation of blower coefficients of the present embodiments, a description will be given of a measurement experiment conducted to attain the blower coefficients which are unique to the blower unit which is required to realize such constant air flow control and calculation based on the measurement experiment. The measurement experiment and the calculation based on the measurement experiment are performed prior to the constant air flow control. The present invention is not limited by the embodiments.

Embodiment 1

FIG. 1 is a block diagram showing an air conditioning apparatus to which a motor control device according to Embodiment 1 of the present invention is applied. As shown in FIG. 1, an air conditioning apparatus 101 configured as a blower apparatus of the present embodiment includes a blower unit 104 which sends air to an air flow passage 102, a motor 105 which drives the blower unit 104, a converter 106 which converts AC power supplied from an AC power supply 103 into DC power, an inverter 107 which converts the DC power into the AC power and supplies the AC power to the motor 105, a position detector 108 which detects the position of a rotor (not shown) of the motor 105, a current detector 109 which detects the current of the motor 105, and a motor control device 110 which controls the air flow of the air conditioning apparatus 101 such that the air flow coincides with a target air flow Q*.

The motor control device 110 includes a speed detecting section 111 which detects a motor speed ω from the signal output from the position detector 108, a torque detecting section 112 which detects motor torque T from the signal output from the current detector 109, a motor output calculating section 113 which calculates a motor output P of the motor 105 based on the motor speed ω and the motor torque T, a memory 114 which stores the target air flow Q* externally input, a target motor output calculating section 115 which calculates a target motor output P* based on the motor speed ω and the target air flow Q* read from the memory 114, a speed command generating section 116 which generates a speed command ω* of the motor 105 such that the motor output P coincides with the target motor output P*, a speed control section 117 which outputs a driving control signal to an inverter to cause the motor speed ω to track the speed command ω*, and a switch 118. In the present embodiment, the speed detecting section 111 serves as a first detecting section which detects a first detection signal indicating the motor speed as a first change amount, the torque detecting section 112 serves as a second detecting section which detects a second detection signal indicating motor torque as a second change amount, and the speed command generating section 116 serves as an operation command generating section which controls the speed as the physical amount of the motor.

Next, the operation and components of the air conditioning apparatus 101 of FIG. 1 will be described in detail. The blower unit 104 supplies air to a desired location through the air flow passage 102. In the present embodiment, the blower unit 104 is a multi-blade fan. Note that the structure or type of the blower unit 104 is not particularly limited, and need not be the multi-blade fan. The motor 105 rotates in a state in which it is joined to the blower unit 104, to drive the blower unit 104. In the present embodiment, the motor 105 is a permanent magnet synchronous motor. Note that the structure or type of the motor 105 is not particularly limited, but may be other motor, for example, an induction motor or an electromagnetic synchronous motor. The converter 106 rectifies and smooths the AC voltage of the AC power supply 103 and converts the AC voltage into a specified DC voltage. The inverter 107 performs semiconductor switching in accordance with the driving control signal received from the motor control device 110, converts the DC voltage from the converter 106 into the AC voltage and supplies the AC voltage to the motor 105 as a driving voltage. A switching configuration or switching method within the inverter 107 is not particularly limited so long as they are adapted to an aim of driving the motor 105. The position detector 108 is attached to the motor 105, and outputs a signal corresponding to the position of the rotor (not shown) of the motor 105. In a case where the position or speed of the rotor can be detected by estimation, the position detector 108 may be omitted. The current detector 109 directly detects the phase current of the motor and outputs a signal corresponding to a phase current value. The current detector 109 may detect the current in any location so long as the motor torque can be estimated from the detected current. For example, the current detector 109 may be inserted into a DC line from the converter 106 to the inverter 107 and detect the current.

Next, the operation and components of the motor control device 110 will be described.

The speed detecting section 111 calculates the motor speed α based on the output signal of the position detector 108. The speed detecting section 111 may calculate the motor speed ω using the motor current or the motor driving voltage, instead of using the output signal of the position detector 108, in a case where the motor 105 is driven by sensorless control that detects position and speed of the rotor by estimation. The torque detecting section 112 calculates the motor torque T based on the output signal of the current detector 109. The motor torque T may be a physical amount including torque information of the motor 105, for example, the motor current, or a vector component that contributes to the torque in the motor current. For example, the vector component that contributes to the torque may be q-axis current in a case where the motor current is d-q converted. Although the speed detecting section 111 and the torque detecting section 112 need not be placed within the motor control device 110, in the example of FIG. 1, they may be placed outside the motor control device 110. In a case where the speed detecting section 111 and the torque detecting section 112 are placed outside the motor control device 110, they output the calculated motor speed ω and the calculated motor torque T to the motor control device 110.

The motor output calculating section 113 calculates the motor output P=T×ω, by multiplying the motor torque T by the motor speed ω, and outputs the motor output P to the speed command generating section 116.

The memory 114 is a storage section comprising RAM, ROM, etc. The target air flow Q* is pre-stored in the ROM. The target motor output calculating section 115 reads the target air flow Q* from the ROM and uses the target air flow Q* in calculation when it performs the calculation as will be described later. A plurality of target air flows Q* may be pre-stored in the ROM. In this case, one target air flow Q* is selected from the plurality of target air flows Q* in response to a communication input from outside the motor control device 110. Or, one target air flow Q* may be selected from the plurality of target air flows Q* by manual operation of the switch 118 provided in the motor control device 110.

Or, the target air flow Q* may not be necessarily pre-stored in the ROM. The target air flow Q* may be suitably transmitted to the motor control device 110 in response to a communication input from outside the motor control device 110. In this case, the received target air flow Q* is stored in the RAM or the like within the memory 114, and updated every time new target air flow Q* is sent.

The value of the target air flow Q* communicatively input from outside is decided based on an air conditioning environment in which the motor 105 is installed. That is, the target air flow Q* is decided depending on how much air is to be supplied to a room as a reference among rooms to be air-conditioned inside a door, how much air flow is efficient for air-conditioning equipment, etc. In other words, the target air flow Q* may be in some cases compensated depending on a climate or the like of an area in which the air conditioning equipment is installed. For example, in an area which is warm and humid, the target air flow Q* may be set to a relatively large value. In a case where the air conditioning environment is known in advance, the target air flow Q* may be set before the motor is installed. As a matter of course, the target air flow Q* may be set in view of the air conditioning environment in the installation of the motor.

The target motor output calculating section 115 calculates the target motor output P* based on the motor speed ω obtained from the speed detecting section 111 and the target air flow Q* read from the memory 114, and outputs the target motor output P* to the speed command generating section 116. Specifically, the target motor output calculating section 115 calculates the target motor output P* as a product of a polynomial of variables obtained by dividing the target air flow Q* by the motor speed ω and the cube of the motor speed ω.

In the present embodiment, especially, the target motor output calculating section 115 calculates the target motor output P* according to the above formula (7).

The above formula (7) indicates the relation in which the motor output in a case where the air flow is the target air flow Q* with respect to an arbitrary motor speed ω, is P*. The coefficients $\alpha_n$, β which feature this relation have values which are unique to the shape and dimension of the blower unit. Hereinafter, the coefficients $\alpha_n$, β will be referred to as the blower coefficients. The values of the blower coefficients $\alpha_n$, β are found by performing the measurement experiment and the calculation prior to the operation (running) under the constant air flow control. The measurement experiment and the calculation based on the measurement experiment will be described later.

The speed command generating section 116 generates a speed command ω* for controlling the motor speed ω of the motor 105 such that the motor output P coincides with the target motor output P*, based on a result of comparison between the motor output P obtained from the motor output calculating section 113 and the target motor output P* output from the target motor output calculating section 115. In other words, in the present embodiment, the motor speed ω is used as the physical amount of the motor which is to be controlled, and the speed command ω* is generated as the operation command of the motor 105.

The speed command generating section 116 generates the speed command ω* according to the following formula (8):

$$\omega^* = \left(\frac{P^*}{P}\right)^{\frac{1}{3}} \cdot \omega \tag{8}$$

In this formula, ω indicates the motor speed of the motor 105, P* indicates the target motor output, and P indicates the motor output.

Now, deriving and basis of the above formula (8) will be described. The formula (8) is derived based on similarity of flows. According to the similarity of flows, the shaft power of the blower unit is proportional to the cube of the rotational speed of the blower unit. This rule applies to general fluidic machines which are other than the blower unit. If the blower unit and the shaft of the motor are joined together without a deflection or detachment, it can be supposed that the shaft power of the blower unit is equal to the motor output and the rotational speed of the blower unit is equal to the motor speed. Therefore, because of the similarity of flows, the motor output of the motor which drives the blower unit is proportional to the cube of the motor speed. From the above, the formula (8) is derived, in which the motor speed changes with a change rate of (⅓)-th power of the change rate of the motor output.

The advantages achieved by the use of the formula (8) will now be described. The value of the speed command $\omega^*$ calculated according to the formula (8) is a motor speed for achieving the motor output which is equal to the target motor output $P^*$. In other words, by controlling the speed of the motor based on the speed command $\omega^*$ calculated according to the formula (8), the motor output P is equal to the target motor output $P^*$. Thus, by controlling the speed of the motor using the formula (8), the target motor output $P^*$ can be attained quickly.

Instead of the above formula (8), the speed command $\omega^*$ may be generated according to the following formula (9):

$$\omega^* = \omega^*_{prev} + K_G(P^* - P) \quad (9)$$

In this formula, $\omega_{prev}^*$ indicates the speed command which is previously output from the speed command generating section 116, $K_G$ indicates a control gain (positive constant), $P^*$ indicates the target motor output, and P indicates the motor output.

The above formula (9) defines the speed command $\omega^*$ as a value derived by integrating a constant multiple of a difference between the target value of the motor output and a present value of the motor output, in every calculation cycle. This means the operation amount of feedback control by integral compensation. By setting the control gain $K_G$ to a sufficiently small value, the speed command $\omega^*$ can be changed gradually.

The speed command generating section 116 may generate the speed command $\omega^*$ using either the formula (8) or the formula (9). In a case where the motor output P is required to be controlled to reach the target motor output $P^*$ quickly, the formula (8) is suitably used. Or, in a case where the motor output P is required to be controlled to reach the target motor output $P^*$ gradually, the formula (9) to which a small control gain $K_G$ is applied, is suitably used. The generation method of the speed command $\omega^*$ is not limited to the formula (8) or the formula (9), so long as the motor output P can coincide with target motor output $P^*$.

The speed control section 117 compares the motor speed e to the speed command $\omega^*$ and outputs a driving control signal to the inverter 107 to cause the motor speed $\omega$ to track the speed command $\omega^*$, thereby controlling the speed of the motor 105.

The switch 118 is provided in the motor control device 110 and manually operated to be able to select one from the plurality of target air flows $Q^*$ stored in the memory 114. In addition, the switch 118 is manually operated to be able to perform switching of control block configuration within the motor control device 110.

In the present embodiment, the motor control device 110 is capable of shifting a present mode to a mode selected from among a plurality of modes by using the switch 118 or a communication input from outside. The plurality of modes include at least a constant air flow control mode, and a speed control mode. In the constant air flow control mode, the motor speed $\omega$ of the motor 105 is controlled so that the motor output P coincides with target motor output $P^*$, based on a result of comparison between the motor output P obtained from the motor output calculating section 113 and the target motor output $P^*$ calculated by the target motor output calculating section 115 based on the motor speed $\omega$ obtained from the speed detecting section 111 and the target air flow $Q^*$. In the speed control mode, the speed control section generates the driving control signal based on the motor speed $\omega$ obtained from the speed detecting section 111 and the motor torque T obtained from the torque detecting section 112.

In the present embodiment, it is supposed that the constant air flow control mode is selected. The speed control mode is utilized in the measurement experiment conducted to find the values of the blower coefficients $\alpha_n$, $\beta$ of the formula (7) used in the target motor output calculating section 115. Instead of using the switch 118, the control block configuration may be switched by a communication input from outside.

The operation of the motor control device 110 configured as described above will be described with reference to FIGS. 2 and 3.

Figure 2:
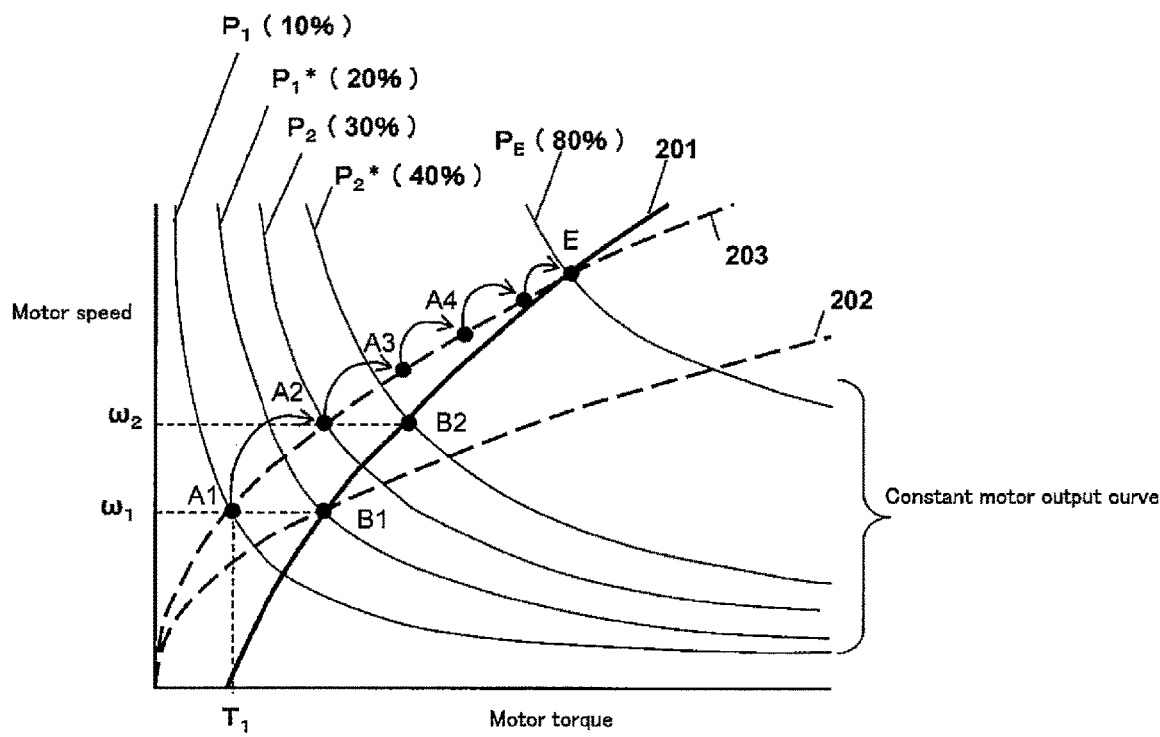
FIG. 2 is a graph showing a motor torque-motor speed characteristic in the motor control device according to Embodiment 1 of the present invention.

FIG. 2 is a graph showing a motor torque-motor speed characteristic in the motor control device according to Embodiment 1 of the present invention. In FIG. 2, a curve 201 (hereinafter will be referred to "constant air flow curve") shows the motor torque-motor speed characteristic in the case where the air flow coincides with the target air flow $Q^*$. A curve 202 and a curve 203 indicate motor torque-motor speed characteristics (hereinafter will be referred to as "pressure loss curves"), respectively, which are unique to the pressure loss condition within the air conditioning system including the air flow passage 102. The motor 105 is able to operate according to the pressure loss curves. Also, the curves indicated by $P_1$, $P_1^*$, $P_2$, $P_2^*$, $P_E$ correspond to constant motor outputs (hereinafter will be referred to as "constant motor output curves"), respectively. The numeric values in parenthesis indicate the motor output values corresponding to the constant motor output curves, respectively, and refer to ratios of the motor output values of the curves in a case where a rated motor output is 100%.

Now, it is supposed that the pressure loss condition of the air conditioning system is indicated by the pressure loss curve 202 and the operation point of the motor 105 lies on a point B1. At this time, the operation point B1 lies on the intersection of the pressure condition curve 202 and the constant air flow curve 201. Therefore, the blower unit 104 supplies the air with an air flow which is equal to the target air flow $Q^*$. At this time, the motor speed is $\omega_1$.

In this state, it is supposed that the air conditioning environment changes and the pressure loss curve 202 changes into the pressure loss curve 203. For example, it is also supposed that some of vent caps provided at a plurality of outlets of the air flow passage 102 are closed, the number of rooms to be air-conditioned is changed, and thereby the pressure loss in the air conditioning system is increased. At this time, the speed of the motor 105 is controlled by the speed control section 117. Therefore, the operation point shifts to a point A1 on the new pressure loss curve 203 while maintaining the motor speed $\omega_1$.

After the operation point has shifted to the point A1, the motor output calculating section 113 calculates a present (current) motor output P based on the present motor speed $\omega_1$ detected by the speed detecting section 111 and the present motor torque $T_1$ detected by the torque detecting section 112. The calculated value $P_1(10\%)$ is output to the speed command generating section 116. The target motor output calculating section 115 calculates the target motor output flow P* by assigning the target air flow Q* and the present motor speed $\omega_0$ to the formula (7). At this time, the calculated target motor output P* is a motor output $P_1$* (20%) at point B1 on the constant air flow curve 201 at which the motor speed is the motor speed $\omega_1$ which is equal to that of the present operation point A1. The motor output $P_1(20\%)$ is output to the speed command generating section 116. Then, the speed command generating section 116 generates the speed command $\omega$* by assigning the input motor output $P_1(10\%)$ and the target motor output $P_1$*(20%) to the formula (8) or the formula (9). If the speed command generating section 116 uses the formula (9), the speed command $\omega$* is derived by multiplying by a positive control gain $K_G$ a difference 10% (=20% minus 10%) obtained by subtracting $P_1(10\%)$ from $P_1$*(20%) and by adding the previous speed command ($\omega_1$) to the resulting multiplication value. Therefore, the speed command $\omega$* which is larger than the present motor speed $\omega_1$ is generated, so that the speed of the motor 105 is increased. The speed control section 117 receives the speed command $\omega$* from the speed command generating section 116 and performs the speed control based on the speed command $\omega$*.

Now, it is supposed that the operation point shifts from A1 to A2 by the speed control. In the same manner, at the operation point A2, the motor control device 110 calculates a present motor output $P_2(30\%)$ and a target motor output $P_2$*(40%), generates a new speed command $\omega$*, and controls the speed. By repeating this, the operation point shifts to A3, A4, . . . , and finally converges at the operation point at which the motor output P coincides with the target motor output P* at $P_E(80\%)$, i.e., an intersection E of the pressure loss curve 203 and the constant air flow curve 201. At this time, the air flow of the air supplied from the blower unit 104 is equal to the target air flow Q*, and thus, the constant air flow control is achieved.

In a case where the pressure condition curve returns from the curve 203 to the curve 202, a procedure which is the reverse of the above procedure occurs. The operation point shifts along the pressure loss curve 202, and returns to an intersection B1 of the pressure loss curve 202 and the constant air flow curve 201.

Figure 3:
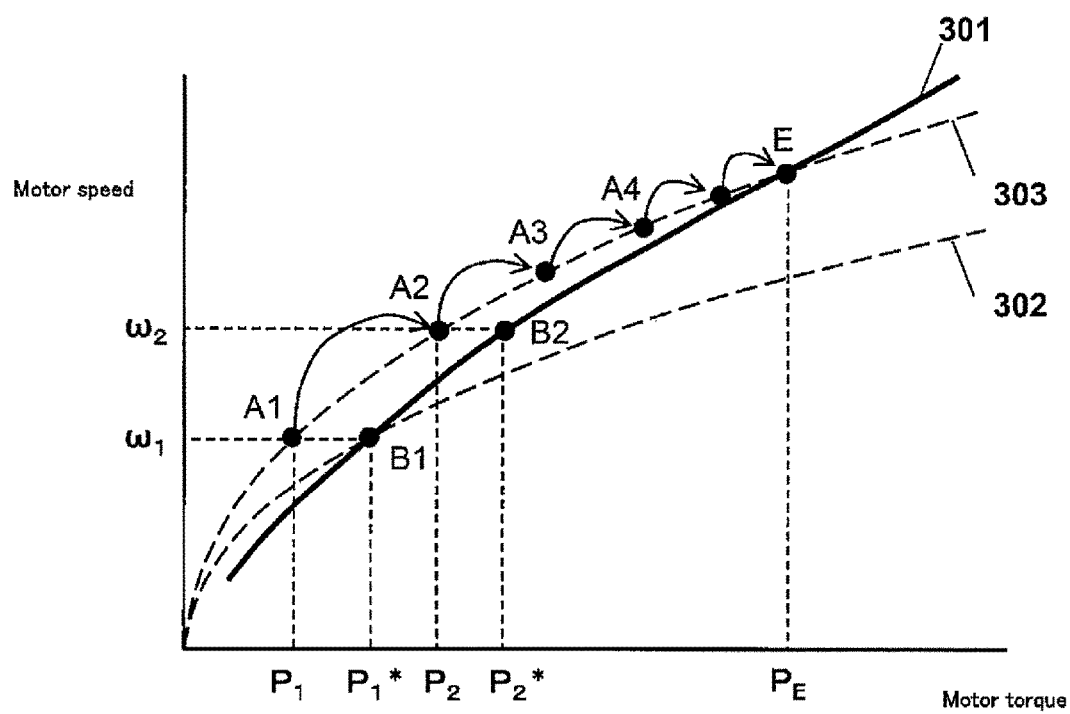
FIG. 3 is a graph showing a motor output-motor speed characteristic in the motor control device according to Embodiment 1 of the present invention.

FIG. 3 is a graph showing a motor output-motor speed characteristic in the motor control device according to Embodiment 1 of the present invention. FIG. 3 shows the above described operation by replacing the torque axis of FIG. 2 by a motor output axis. In FIG. 3, a curve 301 is the constant air flow curve corresponding to the target air flow Q* which is the same as that of the curve 202 of FIG. 2. Curves 302 and 303 are pressure loss curves corresponding to the pressure loss conditions which are the same as those of the curves 202 and 203 of FIG. 2, respectively.

Now it is supposed that the initial position of the operation point is the point B1, and the pressure loss curve in the air conditioning system shifts from 302 to 303. In response to this change, the operation point shifts to point A1, the motor output calculating section 113 calculates a present motor output $P=P_1$, and the target motor output calculating section 115 calculates a motor output $P^*=P_1$* at the point B1 on the constant air flow curve 301 at which the present motor speed $\omega_1$ is obtained. Then, the speed command generating section 116 generates the speed command $\omega$* so that motor output P becomes close to the target motor output $P_1$*, and the speed control section 117 performs the speed control based on the speed command $\omega$*. By repeating this, as in the example of FIG. 2, the operation point shifts to A2, A3, A4, . . . , along the pressure loss curve 303 and finally converges at an intersection E of the pressure loss curve 303 and the constant air flow curve 301. Thus, the constant air flow control is achieved.

Next, the operation stability function and protection function of the constant air flow control of the motor control device 110 of the present embodiment will be described.

Figure 4:
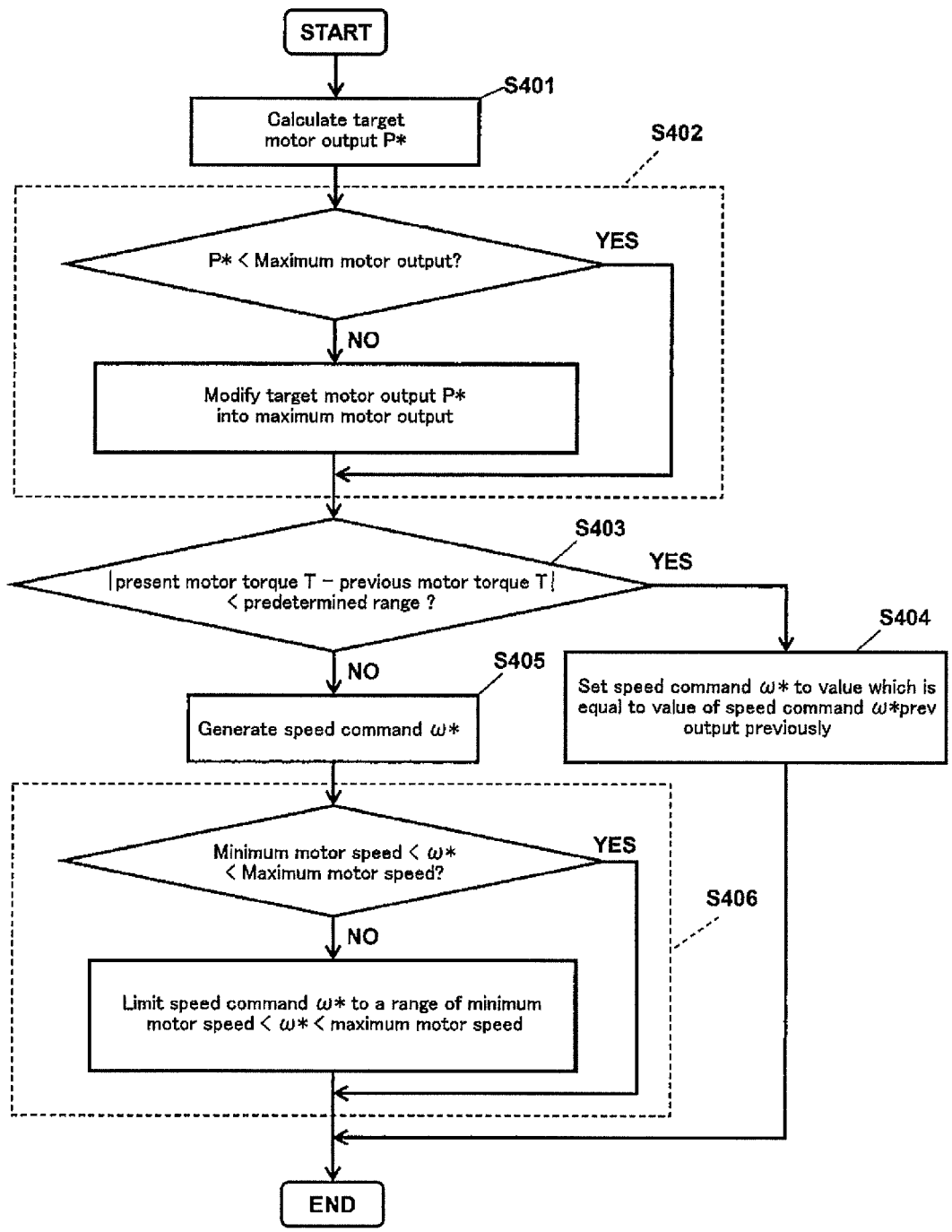
FIG. 4 is a flowchart showing the processing of a target motor output calculating section and a speed command generating section in the motor control device according to Embodiment 1 of the present invention.

FIG. 4 is a flowchart showing the processing of the target motor output calculating section and the speed command generating section in the motor control device according to Embodiment 1 of the present invention. Step S401 and step S402 are processing performed by the target motor output calculating section 115, while step S403 to step S406 are processing performed by the speed command generating section 116. The target motor output calculating section 115 obtains the motor speed $\omega$ detected by the speed detecting section 111 and the target air flow Q* stored in the memory 114. Also, the speed command generating section 116 obtains the motor speed $\omega$ detected by the speed detecting section 111 and the motor torque T detected by the torque detecting section 112.

Firstly, step S401 and step S402 of FIG. 4 will be described.

In initial step S401, the target motor output calculating section 115 calculates the target motor output P* according to the above stated formula (7). Then, in step S402, the target motor output calculating section 115 determines whether or not the target motor output P* calculated in step S401 is equal to or smaller than a predetermined maximum motor output. When the target motor output calculating section 115 determines that the target motor output P* is equal to or smaller than the predetermined maximum motor output, it does not modify the target motor output P*. On the other hand, when the target motor output calculating section 115 determines that the target motor output P* is larger than the predetermined maximum motor output, it modifies the target motor output P* into the predetermined maximum motor output.

The advantages of step S402 will be described. If the upper limit is not set in the motor output, an excess current may flow through a motor driving circuit including the converter 106 and the inverter 107, and exceed a rated current value which is a permissible current value for a moment, or for a continued period, in some cases. In such a case, due to heat generation of elements or the like, the motor driving circuit is likely to fail. To avoid this, the maximum motor output is set in the target motor output P*. This makes it possible to limit an increase in the value of the current flowing through the motor driving circuit, and hence prevent the failure of the motor driving circuit can be prevented.

Next, step S403 to step S406 of FIG. 4 will be described.

In step S403, the speed command generating section 116 calculates a difference between the motor torque T currently detected and the motor torque T previously detected. When the difference falls outside a predetermined range (first predetermined range), the speed command generating section 116 performs step S405. On the other hand, when the difference falls within the predetermined range, the speed command generating section 116 determines that a change in the motor torque T is less (slight), and performs step S404. In step S404, the speed command generating section 116 sets the speed command $\omega$* to a value which is equal to the value of the speed command $\omega^*_{prev}$ previously output. Then, the speed command generating section 116 outputs the modified speed command $\omega^*_{prev}$ to the speed control section 117.

The advantages of step S403 and step S404 will be described. If step S403 and step S404 are not performed and an attempt is made to change the speed command $\omega^*$ in response to a slight change in the motor torque T in step S405, the speed command $\omega^*$ will track the slight change in the motor torque T and oscillate. The air flow of the air supplied from the air conditioning apparatus 101 changes back and forth, while crossing the air flow value of the target air flow $Q^*$. Thus, the air flow does not stably converge. To avoid this, in the present embodiment, a dead zone for detection of the torque is set as the above described range, to prevent the speed command $\omega^*$ from oscillating in a range near a convergence point, thereby allowing the air flow to steadily converge at the target air flow $Q^*$.

In step S403, it may be decided whether or not to modify the speed command $\omega^*$, by determining whether or not a difference between the motor output P and the target motor output $P^*$ falls within a second predetermined range or determining whether or not a difference between the motor output P currently calculated and the motor output P previously calculated falls within a third predetermined range, instead of determining whether or not the difference between the motor torque T currently detected and the motor torque T previously detected falls within the first predetermined range. In this case, the same advantages can be attained by setting a dead zone in the motor output.

In step S405, the speed command generating section 116 calculates the speed command $\omega^*$ according to the above formula (8) or the above formula (9). Then, in step S406, the speed command generating section 116 determines whether or not the speed command $\omega^*$ falls within a range between a predetermined minimum motor speed and a predetermined maximum motor speed. When the speed command $\omega^*$ falls within the above range, the speed command generating section 116 does not modify the speed command $\omega^*$. When the speed command $\omega^*$ is lower than the predetermined minimum motor speed, the speed command generating section 116 modifies the speed command $\omega^*$ into the predetermined minimum motor speed, while when the speed command $\omega^*$ exceeds the predetermined maximum motor speed, the speed command generating section 116 modifies the speed command $\omega^*$ into the predetermined maximum motor speed.

The advantages of step S406 will be described. There is an air conditioning environment in which the motor speed $\omega$ for attaining the air flow value of the target air flow $Q^*$ need not be so high, for example, in a case where the pressure loss in the air flow passage 102 is small. In such an air conditioning environment, the motor speed $\omega$ may be very low. In this case, the target motor output calculating section 115 calculates the target motor output $P^*$ by assigning a small value to $\omega$ of the formula (7). For this reason, due to the limited calculation resolution ability of the motor control device 110, the target motor output $P^*$ is calculated as substantially zero. When the target motor output $P^*$ which is substantially zero is input to the speed command generating section 116, the generated speed command $\omega^*$ becomes substantially zero, and the speed of the motor 105 is further decreased. If this is repeated, the speed command $\omega^*$ becomes zero, so that the motor 105 is stopped. To avoid this, the predetermined minimum motor speed which is the lower limit is set in the speed command $\omega^*$. Thus, stopping of the motor 105 can be prevented.

On the other hand, in a case where the pressure loss in the air flow passage 102 is large, the speed command $\omega^*$ may become an extremely large value. In this case, an attempt is made to implement the operation which is higher than the ability of the motor 105, so that the operation becomes unstable, or the blower unit 104 or the motor 105 may vibrate greatly due to the high-speed rotation of the motor 105, and may fail. To avoid this, the predetermined maximum motor speed which is the upper limit is set in the speed command $\omega^*$. In this way, it becomes possible to prevent a situation in which the control becomes unstable or the blower unit and the motor fail.

As described above, the motor control device 110 of the present embodiment includes the target motor output calculating section 115 which calculates the target motor output $P^*$ which causes the air flow of the air supplied from the blower unit 104 to coincide with the target air flow $Q^*$, based on the motor speed $\omega$ and the target air flow $Q^*$, and the speed command generating section 116 which generates the speed command $\omega^*$ for controlling the motor speed $\omega$ so that the motor output P coincides with the target motor output $P^*$ based on a result of comparison between the motor output P and the target motor output $P^*$.

In this configuration, even when the pressure loss condition or the static pressure changes, the motor 105 can be controlled while automatically searching the target motor output $P^*$ which can attain the target air flow $Q^*$. Therefore, the constant air flow control can be performed with a high accuracy, and irrespective of a change in the pressure loss condition or a change in the static pressure.

Embodiment 2

Figure 5:
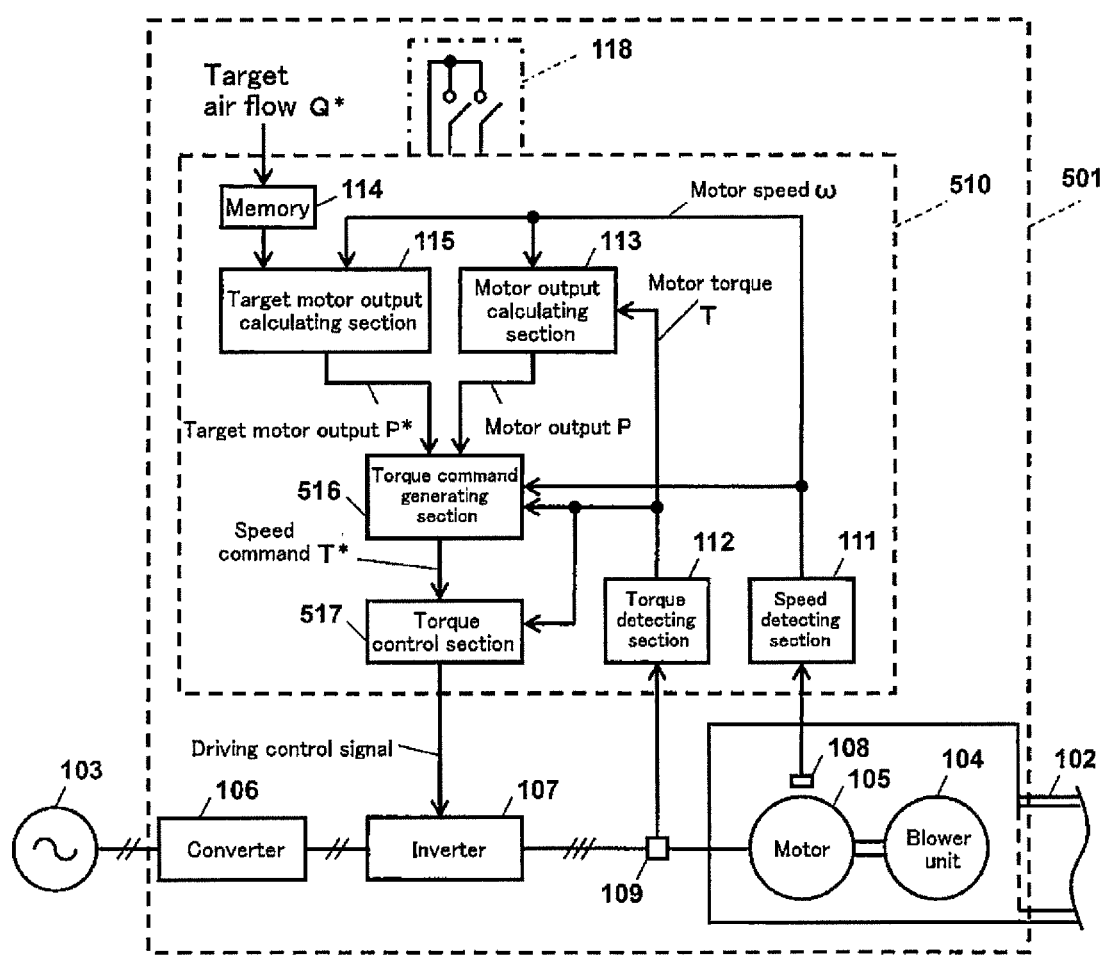
FIG. 5 is a block diagram showing a motor control device according to Embodiment 2 of the present invention.

Hereinafter, a motor control device according to Embodiment 2 of the present invention will be described. FIG. 5 is a block diagram showing the motor control device according to Embodiment 2 of the present invention. As shown in FIG. 5, Embodiment 2 is different from Embodiment 1 in that the speed command generating section 116 and the speed control section 117 of Embodiment 1 are replaced by a torque command generating section 516 and a torque control section 517. The other components are identical to those of Embodiment 1. Therefore, they are designated by the same reference symbols and will not be described repeatedly.

The operations of the torque command generating section 516 and of the torque control section 517 in the motor control device 510 of FIG. 5 will be described.

The torque command generating section 516 generates a torque command $T^*$ for controlling the motor torque T of the motor 105 so that the motor output P coincides with the target motor output $P^*$, based on a result of comparison between the motor output P obtained from the motor output calculating section 113 and the target motor output $P^*$ obtained from the target motor output calculating section 115. In other words, in the present embodiment, the motor torque T is used as the physical amount of the motor which is to be controlled, and the torque command generating section 516 serves as an operation command generating section for generating the torque command $T^*$ as the operation command of motor 105.

The torque command generating section 516 generates the torque command $T^*$ using the formula (10):

$$T^* = \left(\frac{P^*}{P}\right)^{\frac{2}{3}} \cdot T \tag{10}$$

In this formula, T indicates the motor torque of the motor 105, P* indicates the target motor output, and P indicates the motor output.

Now, deriving and basis of the above formula (10) will be described. The formula (10) is derived based on the similarity of flows. According to the similarity of flows, the shaft power of the blower unit is proportional to the cube of the rotational speed of the blower unit. This rule applies to general fluidic machines which are other than the blower unit. If the blower unit and the shaft of the motor are joined together without a deflection or detachment, it can be supposed that the shaft power of the blower unit is equal to the motor output and the rotational speed of the blower unit is equal to that of the motor speed. Therefore, because of the similarity of flows, the motor output of the motor which drives the blower unit is proportional to the cube of the motor speed. Also, by utilizing the fact that the motor output is a product of the motor torque and the motor speed, a relation is derived, in which the motor torque for driving the blower unit is proportional to the square of the motor speed. By combining the above relations, the formula (10) is derived, in which the motor torque for driving the blower unit is proportional to ⅔-th power of the motor output The advantages achieved by the use of the formula (10) will be described. The value of the torque command T* calculated according to the formula (10) is motor torque which can achieve the motor output which is equal to the target motor output P*. In other words, by controlling the torque of the motor by using the torque command $\omega^*$ calculated according to the formula (10), the motor torque becomes equal to the target motor output P*. Therefore, by controlling the torque of the motor using the formula (10), the target motor output P* can be attained quickly.

Instead of the formula (10), the torque command T* may be generated according to the following formula (11):

$$T^* = T^*_{prev} + K_{GT}(P^* - P) \quad (11)$$

In this formula (11), $T_{prev}^*$ indicates the torque command which is previously output from the torque command generating section 516, $K_{GT}$ indicates a control gain (positive constant), P* indicates the target motor output, and P indicates the motor output.

The above formula (11) defines the torque command T* as a value derived by integrating a constant multiple of a difference between the target value of the motor output and the present value of the motor output, in every calculation cycle. This means the operation amount of feedback control by integral compensation. By setting the control gain $K_{GT}$ to a sufficiently small value, the torque command T* can be changed gradually.

The torque command generating section 516 may generate the torque command T* using either the formula (10) or the formula (11). In a case where the motor output P is required to be controlled to reach the target motor output P* quickly, the formula (10) is suitably used. Or, in a case where the motor output P is required to be controlled to reach the target motor output P* gradually, the formula (11) to which a small control gain $K_{GT}$ is applied, is suitably used. The generation method of the torque command T* is not limited to the formula (10) or the formula (11), so long as the motor output P can coincide with target motor output P*.

The torque control section 517 compares the motor torque T to the torque command T* and outputs a driving control signal to the inverter 107 to cause the motor torque T to track the torque command T*, thereby controlling the torque of the motor 105.

The operation of the motor control device 510 configured as described above will be described with reference to FIG. 6.

Figure 6:
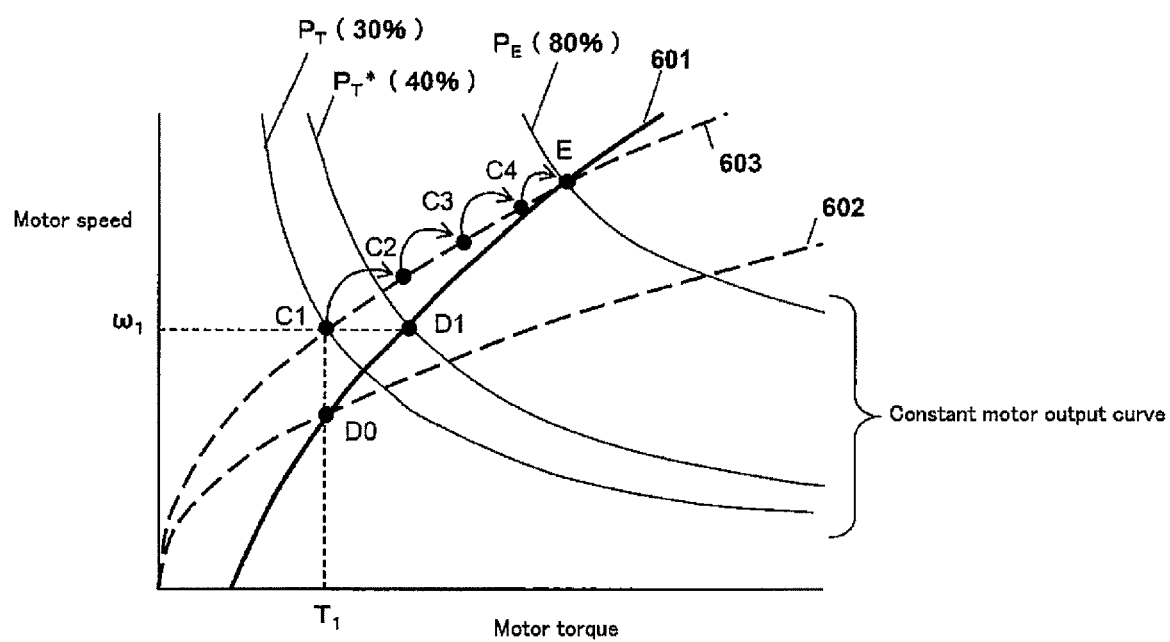
FIG. 6 is a graph showing a motor torque-motor speed characteristic in the motor control device according to Embodiment 2 of the present invention.

FIG. 6 is a graph showing a motor torque-motor speed characteristic in the motor control device according to Embodiment 2 of the present invention. In FIG. 6, a curve 601 (hereinafter will be referred to "constant air flow curve") shows the motor torque-motor speed characteristic in the case where the air flow coincides with the target air flow Q*. A curve 602 and a curve 603 indicate motor torque-motor speed characteristics (hereinafter will be referred to as "pressure loss curves"), respectively, which are unique to the pressure loss condition within the air conditioning system including the air flow passage 102. The motor 105 is able to operate according to the pressure loss curves. Also, the curves indicated by $P_T$, $P_T^*$, $P_E$ correspond to constant motor outputs (hereinafter will be referred to as "constant motor output curves"), respectively. The numeric values in parenthesis indicate the motor output values corresponding to the constant motor output curves, respectively, and refer to ratios of the motor output values of the constant motor output curves in a case where the rated motor output is 100%.

Now, it is supposed that the pressure loss condition of the air conditioning system is indicated by the pressure loss curve 602 and the operation point of the motor 105 lies on a point D0. At this time, the operation point D0 lies on the intersection of the pressure condition curve 602 and the constant air flow curve 601. Therefore, the blower unit 104 supplies the air with an air flow which is equal to the target air flow Q*. At this time, the motor torque is $T_1$.

In this state, it is supposed that the air conditioning environment changes and the pressure loss curve 602 changes into the pressure loss curve 603. For example, it is also supposed that some of vent caps provided at a plurality of outlets of the air flow passage 102 are closed, the number of rooms to be air-conditioned is changed, and thereby the pressure loss in the air conditioning system is increased. At this time, the torque of the motor 105 is controlled by the torque control section 517. Therefore, the operation point shifts to a point C1 on the new pressure loss curve 603 while maintaining the motor torque $T_1$.

After the operation point has shifted to the point C1 the motor output calculating section 113 calculates a present (current) motor output P based on the present motor speed $\omega_1$ detected by the speed detecting section 111 and the present motor torque $T_1$ detected by the torque detecting section 112. The calculated value $P_T(30\%)$ is output to the torque command generating section 516. The target motor output calculating section 115 calculates the target motor output P* by assigning the target air flow Q* and the present motor speed $\omega_1$ to the formula (7). At this time, the calculated target motor output P* is a motor output $P_T^*(40\%)$ at a point D1 on the constant air flow curve 601 at which the motor speed is the motor speed $\omega_1$ which is equal to that of the present operation point C1. The motor output $P_T^*(40\%)$ is output to the speed command generating section 116. Then, the torque command generating section 516 generates the torque command T* by assigning the input motor output $P_T(30\%)$ and the target motor output $P_T^*(40\%)$ to the formula (10) or the formula (11). If the torque command generating section 516 uses the formula (11), the torque command T* is derived by multiplying by a positive control gain $K_{GT}$ a difference 10% (=40% minus 30%) obtained by subtracting $P_T(30\%)$ from $P_T^*(40\%)$ and by adding the previous torque command ($T_1$) to the resulting multiplication value. Therefore, the torque command T* which is larger than the present motor torque $T_1$ is generated, so that the speed of the motor 105 is increased. The torque control section 517 receives the torque command T* and performs the torque control based on the torque command T*.

Now, it is supposed that the operation point shifts from C1 to C2 by the torque control. In the same manner, at the operation point C2, the motor control device 510 calculates the motor output P and the target motor output P*, generates a new torque command T*, and controls the torque. By repeating this, the operation point shifts to C3, C4, . . . , and finally converges at the operation point at which motor output P coincides with the target motor output P* at $P_E(80\%)$, i.e., an intersection E of the pressure loss curve 603 and the constant air flow curve 601. At this time, the air flow of the air supplied from the blower unit 104 is equal to the target air flow Q*, and thus, the constant air flow control is achieved.

In a case where the pressure condition curve returns from the curve 603 to the curve 602, a procedure which is the reverse of the above procedure occurs. The operation point shifts along the pressure loss curve 602, and returns to an intersection D0 of the pressure loss curve 602 and the constant air flow curve 601.

Next, the operation stability function and protection function of the constant air flow control of the motor control device 510 of the present embodiment will be described.

Figure 7:
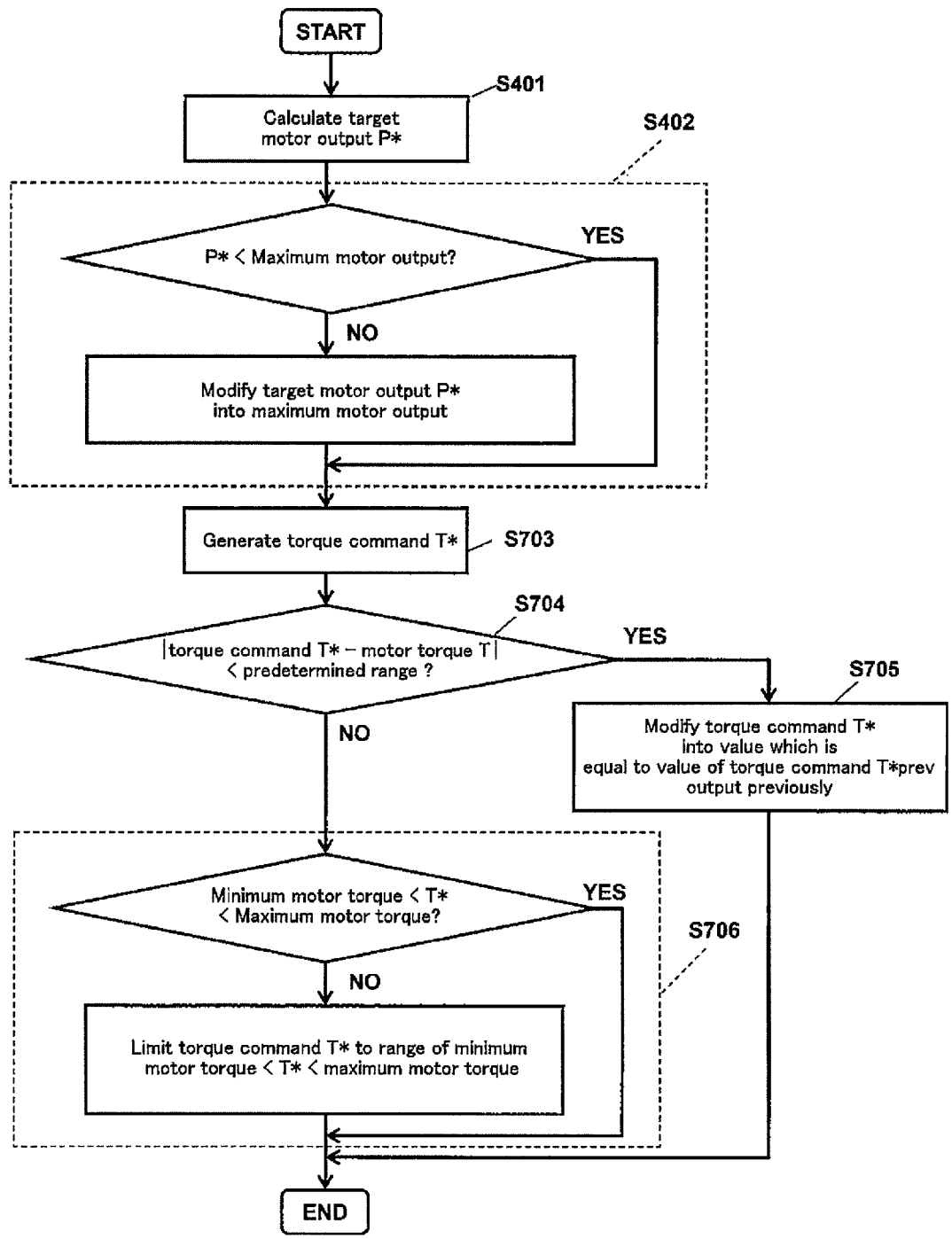
FIG. 7 is a flowchart showing the processing of a target motor output calculating section 115 and a torque command generating section in a motor control device according to Embodiment 2 of the present invention.

FIG. 7 is a flowchart showing the processing of the target motor output calculating section 115 and the torque command generating section 516 in the motor control device according to Embodiment 2 of the present invention. Step S401 and step S402 are processing performed by the target motor output calculating section 115, while step S703 to step S706 are the processing performed by the torque command generating section 516. Step S401 and step S402 are the same as step S401 and step S402 of FIG. 4 in Embodiment 1 of the constant air flow control, and therefore, processing and advantages thereof will not be described repeatedly. The torque command generating section 516 obtains the motor speed ω detected by the speed detecting section 111 and the motor torque T detected by the torque detecting section 112.

Step S703 to step S706 of FIG. 7 will be described.

In step S703 which comes after step S402, the torque command generating section 516 calculates the torque command T* according to the formula (10) or the formula (11). Then, in step S704, the torque command generating section 516 calculates a difference between the torque command T* and the motor torque T detected by the torque detecting section 112. When the difference falls outside a predetermined range (fourth predetermined range), the torque command generating section 516 performs step S706. On the other hand, when the difference falls within the predetermined range, the torque command generating section 516 determines that a change in the motor torque T is slight (less), and performs step S705. In step S705, the torque command generating section 516 modifies the torque command T* into the value which is equal to the value of a torque command T*$_{prev}$ output previously from the torque command generating section 516. Then, the torque command generating section 516 outputs the modified torque command T$_{prev}$ to the torque control section 517.

The advantage of step S704 and step S705 will be described. If step S704 and step S705 are not performed and an attempt is made to change the torque command T* in response to a slight change in the motor torque T, the torque command T* will track the slight change in the motor torque T and oscillate. The air flow of the air supplied from the air conditioning apparatus 501 changes back and forth, while crossing the air flow value of the target air flow Q*. Thus, the air flow does not stably converge. To avoid this, in the present embodiment, a dead zone for detection of the torque is set as the above described range, to prevent the torque command T* from oscillating in a range near a convergence point, thereby allowing the air flow to steadily converge at the target air flow Q*.

In step 704, instead of using the difference between the torque command T* and the motor torque T, a difference between the motor output P and the target motor output P*, or a difference between the motor output currently calculated and the motor output P calculated previously may be used. In this case, by setting a dead zone in the motor output, similar effects can be attained.

In step S706, the torque command generating section 516 determines whether or not the torque command T* falls within a range between predetermined minimum motor torque and predetermined maximum motor torque. When the torque command generating section 516 determines that the torque command T* falls within the range, it does not modify the torque command T*. On the other hand, when the torque command generating section 516 determines that the torque command T* is smaller than the predetermined minimum motor torque, it modifies the torque command T* into the predetermined minimum motor torque, while when the torque command generating section 516 determines that the torque command T* is larger than the predetermined maximum motor torque, it modifies the torque command T* into the predetermined maximum motor torque.

The advantages of step S706 will be described. There is an air conditioning environment in which the motor speed ω for attaining the air flow value of the target air flow Q* need not be so high, for example, in a case where the pressure loss in the air flow passage 102 is small. In such an air conditioning environment, the motor speed ω may be very low. In this case, the target motor output calculating section 115 calculates the target motor output P* by assigning a small value to ω of the formula (7). For this reason, due to the limited calculation resolution ability of the motor control device 510, the target motor output P* is calculated as substantially zero. When the target motor output P* which is substantially zero is input to the torque command generating section 516, the generated torque command T* becomes substantially zero, and thereby the speed of the motor 105 is further decreased. If the above operation is repeated, the torque command T* becomes zero, so that the motor 105 is stopped. To avoid this, the predetermined minimum motor torque which is the lower limit is set in the torque command T*, and thereby stopping of the motor 105 can be prevented.

On the other hand, in a case where the pressure loss in the air flow passage 102 is large, the torque command T* for attaining the air flow value of the target air flow Q* may become a large value. In this case, an attempt is made to implement the operation which is higher than the ability of the motor 105, so that the operation becomes unstable, or a motor current becomes excessively high. If the motor current becomes excessively high and exceeds a rated current value, a failure is likely to occur in the motor 105 due to heat generation of motor windings, or its efficiency is likely to be significantly reduced. If the blower unit 104 is placed in an excess load state due to the ingress of foreign matters into the blower unit 104, under a state in which the upper limit of the motor torque T is not set, a failure is likely to occur in the air conditioning apparatus 501 including the blower unit 104 and the motor 105, because the motor 105 attempts to increase the torque. To avoid this, the predetermined maximum motor torque which is the upper limit is set in the torque command T*, and thus, it becomes possible to prevent a situation in which the control becomes unsteady or a failure occurs in the air conditioning apparatus.

As described above, the motor control device 510 of the present invention includes the target motor output calculating section 115 which calculates the target motor output P* which causes the air flow of air supplied from the blower unit 104 to coincide with the target air flow Q*, based on the motor speed ω and the target air flow Q*, and the torque command generating section 516 which generates the torque command T* for controlling the motor torque T so that the motor output P coincides with the target motor output P*, based on a result of comparison between the motor output P and the target motor output P*.

In this configuration, even when the pressure loss condition or the static pressure changes, the motor 105 can be controlled while automatically searching the target motor output P* which can attain the target air flow Q*. Therefore, the constant air flow control can be performed with a high accuracy, and irrespective of a change in the pressure loss condition or a change in the static pressure.

Calculation Example 1 of Blower Coefficients

In the constant air flow control according to Embodiment 1 and Embodiment 2 as described above, the target motor output P* is calculated according to the formula (7). The values of the blower coefficients $\alpha_n$, $\beta$ in the formula (7) are different depending on the shape and dimension of the blower unit, and are found by preliminarily performing the measurement experiment and calculation prior to the operation under the constant air flow control.

Now, the measurement experiment and calculation example based on the measurement experiment, for deriving the values of the blower coefficients $\alpha_n$, $\beta$ will be described.

Figure 8:
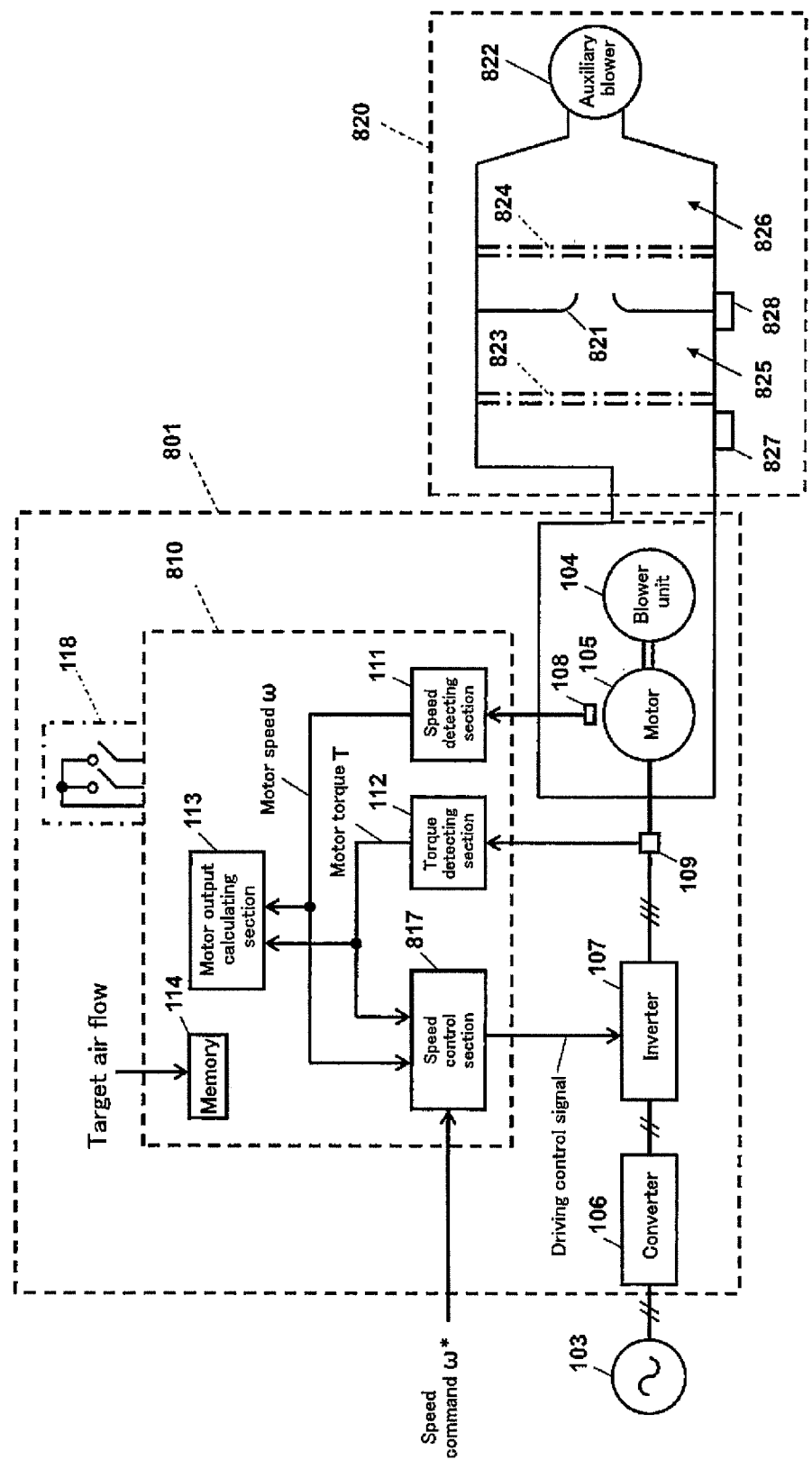
FIG. 8 is a block diagram showing the configuration for calculating blower coefficients in the motor control device according to Embodiment 1 of the present invention.

FIG. 8 is a block diagram showing the configuration for calculating the blower coefficients in the motor control device according to Embodiment 1 of the present invention. FIG. 8 shows the configuration in which the air conditioning apparatus 101 of Embodiment 1 is detached from the air flow passage 102 and connected to wind tunnel experiment equipment 820.

When the blower coefficients are calculated, the motor control device 110 of FIG. 1 is configured as a motor control device 810 operating in the speed control mode. Therefore, in the example of FIG. 8, the motor control device 810 operating in the speed control mode includes the speed detecting section 111, the torque detecting section 112, the motor output calculating section 113, the memory 114 and a speed control section 817. When the air conditioning apparatus 501 of Embodiment 2 of FIG. 5 is detached from the air flow passage 102 and connected to the wind tunnel experiment equipment 520, the same configuration as that of FIG. 8 is provided.

In the calculation example of the blower coefficients, the motor output calculating section 113 calculates the motor output P=T×ω by performing multiplication on the motor speed ω obtained from the speed detecting section 111 and the motor torque T obtained from the torque control section 112. The calculated motor output P may be observed by an experimenter via a communication output or the like to outside.

The speed control section 817 receives the speed command ω* from outside, and outputs to the inverter 107 a driving control signal which causes the motor speed ω to track the speed command ω*, thereby controlling the speed of the motor 105.

The memory 114 is a storage section comprising RAM, ROM, etc. The blower coefficient values derived by the measurement experiment and calculation as will be described later can be stored in the memory 114.

The other components of the air conditioning apparatus 801 are the same as those of Embodiment 1 of the constant air flow control, and the operation of the same components will not be described repeatedly.

The wind tunnel experiment equipment 820 is an apparatus which reproduces and simulates an actual air conditioning system. The wind tunnel experiment equipment 820 includes a first chamber 825 connected to the blower unit 104, a nozzle 821 attached to the tip end of the first chamber 825, a second chamber 826 connected to the first chamber 825 via the nozzle 821, an auxiliary blower 822 connected to the tip end of the second chamber 826, a static pressure meter 827 which measures a static pressure within the first chamber 825, and an air flow meter 828 which measures the air flow based on a pressure difference between the chambers 825 and 826 which are in front of and behind the nozzle 821, respectively.

The wind tunnel experiment equipment 820 is capable of adjusting the pressure difference between the chambers 825 and 826 which are in front of and behind the nozzle 821, respectively, by opening and closing the nozzle 821 and by adjusting the rotational speed of the auxiliary blower 822. Inside the first chamber 825 and the second chamber 826, rectification grills 823, 824, are provided, respectively, to serve to rectify an air flow. The static pressure meter 827 measures the static pressure based on the pressure difference between the pressure within the first chamber 825 and an atmospheric pressure. The air flow meter 828 measures the air flow based on the pressure difference between the chambers 825 and 826 which are in front of and behind the nozzle 821, respectively. The configuration of the wind tunnel experiment equipment 820 is not limited to the above, but any configuration may be used so long as the static pressure and the air flow can be adjusted and measured.

Figure 9:
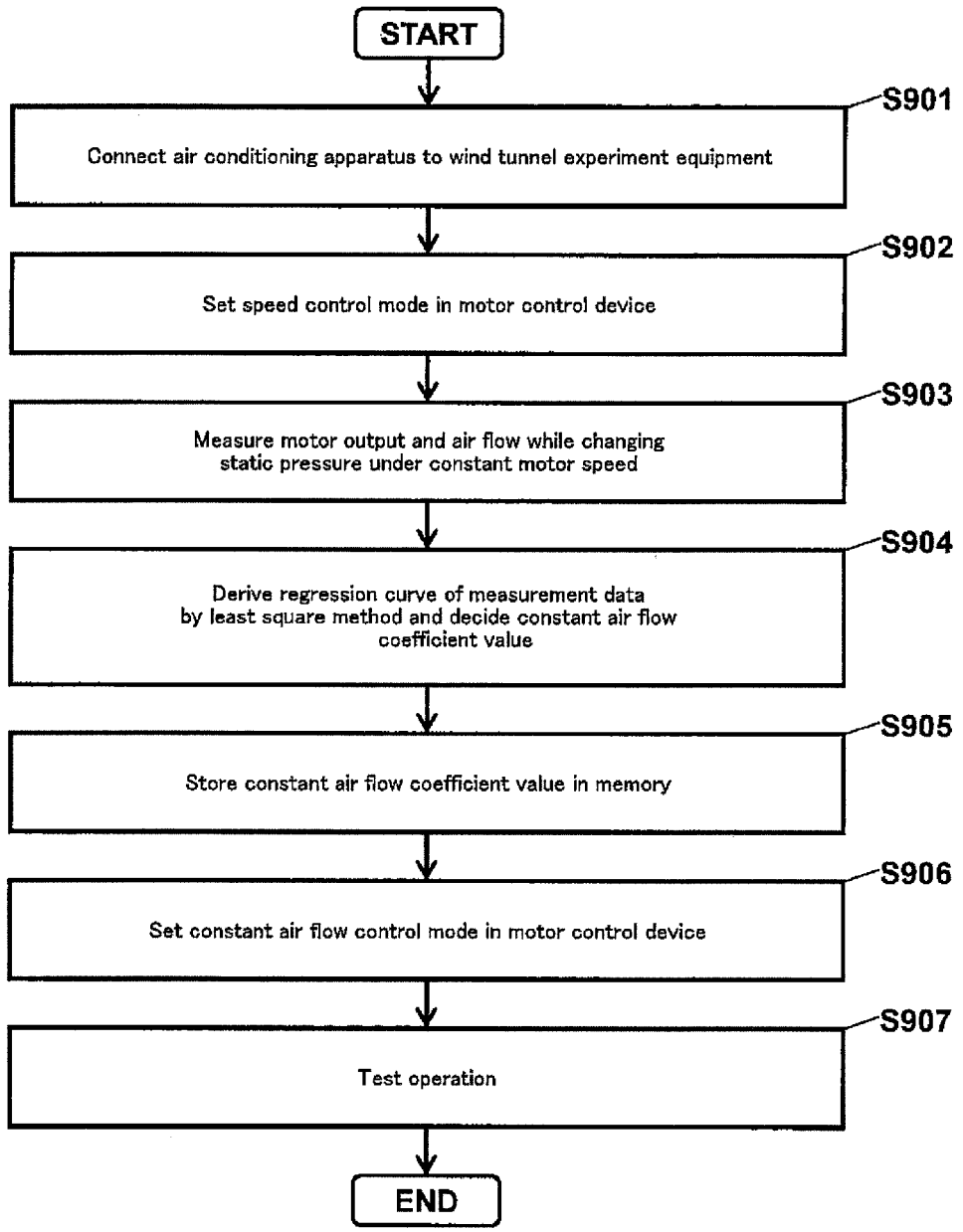
FIG. 9 is a flowchart showing the procedure for calculating the blower coefficients in the motor control device according to Embodiment 1 of the present invention.

FIG. 9 is a flowchart showing the procedure for calculating the blower coefficients in the motor control device according to Embodiment 1 of the present invention.

Initially, in step S902, as shown in FIG. 8, the air conditioning apparatus 801 is connected to the wind tunnel experiment equipment 820.

Then, in step S902, the control block configuration of the motor control device 801 is set to initiate the speed control mode as shown in FIG. 8, by the manual operation of the switch 118 or the communication input.

Then, in step S903, a speed command ω* which is set to one speed value is input to the motor control device 810, and the blower unit 104 is controlled at a constant speed using one speed value. Then, different static pressure states are created while keeping the speed at the constant speed, and the air flow and the motor output are measured. The static pressures are adjusted by opening and closing the nozzle 821 and by adjusting the rotational speed of the auxiliary blower 822 in the wind tunnel experiment equipment 820. The static pressure meter 827 measures the static pressure. The air flow is measured by compensating using the temperature or the like, the pressure difference between the chambers 825 and 826 which are in front of and behind the nozzle 821, respectively, which is observed by the air flow meter 828. Table 1 illustrated below is an example of the motor speed [min$^{-1}$] used in this measurement experiment, the measured motor torque [N·m], the air flow [m$^3$/min], and the motor output [W].

TABLE 1

| Motor speed | | Motor torque | Air flow | Motor output |
|---|---|---|---|---|
| [min$^{-1}$] | [rad/sec] | [N · m] | [m$^3$/min] | [W] |
| 700 | 73.3 | 4.90 | 42.92 | 359.2 |
| 700 | 73.3 | 4.15 | 37.04 | 304.2 |
| 700 | 73.3 | 3.33 | 30.13 | 244.1 |
| 700 | 73.3 | 2.86 | 25.00 | 209.6 |
| 700 | 73.3 | 2.31 | 19.10 | 169.3 |
| 700 | 73.3 | 1.84 | 12.66 | 134.9 |

Then, in step S904, by regressing the measured data to the formula (3), the value of the blower coefficient $\alpha_n$ is decided based on the value of the coefficient $K_n$. Note that the regression calculation may be performed by the motor control device 810, or measured data may be sent to an external computer, and this external computer may perform the calculation. In the present embodiment, the order of the regression formula is set to 2. In this case, the regression formula is a second-order polynomial of the following formula (12), which is derived by assigning 2 to i in the formula (3):

$$P_s = K_2 \cdot Q_s^2 + K_1 \cdot Q_s + K_0 \quad (12)$$

In this formula, $P_s$ indicates the measured motor output, $Q_s$ indicates the measured air flow, and $K_2$, $K_1$, $K_0$ indicate constants representing the coefficients of the regression formula, respectively.

Figure 10:
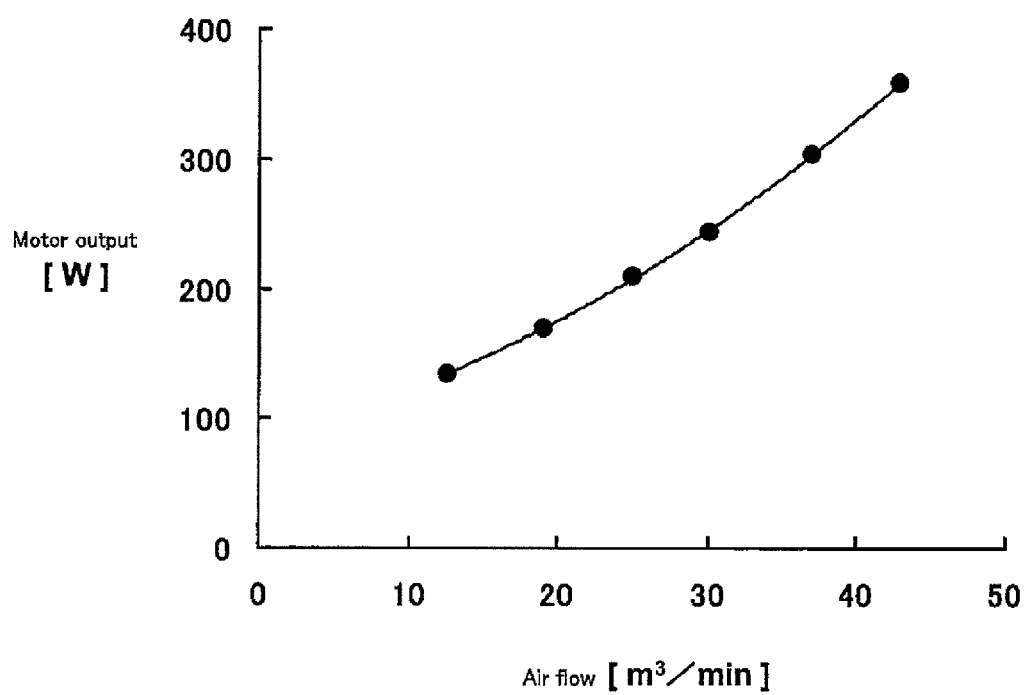
FIG. 10 is a graph showing an air flow-motor output characteristic formed by plotting measurement data of table 1 and its regression curve.

The values of the coefficients $K_2$, $K_1$, $K_0$ are the blower coefficient $\alpha_n$ (n=0, 1, 2). The motor speed used in the measurement in step S903 is the value of the blower coefficient $\beta$. Table 2 illustrated below shows the values of the blower coefficients $\alpha_n$ (n=0, 1, 2) and $\beta$ which are derived by regressing the measurement data of the table 1 to the formula (12) by least square method. FIG. 10 is a graph showing the air flow-motor output characteristic, which is formed by plotting the measurement data of table 1 and its regression curve.

TABLE 2

Coefficient values derived by assigning data of
table 1 to formula (12) by least square method $\alpha_2 = K_2 = 8.40\text{E}-02$
$\alpha_1 = K_1 = 2.75\text{E}+00$
$\alpha_0 = K_0 = 8.66\text{E}+01$
$\beta = 73.3$ (rad/sec)

Then, in step S905, the values of the derived blower coefficients $\alpha_n$, $\beta$ are stored in the memory 114 via the communication input, or the like.

Figure 11:
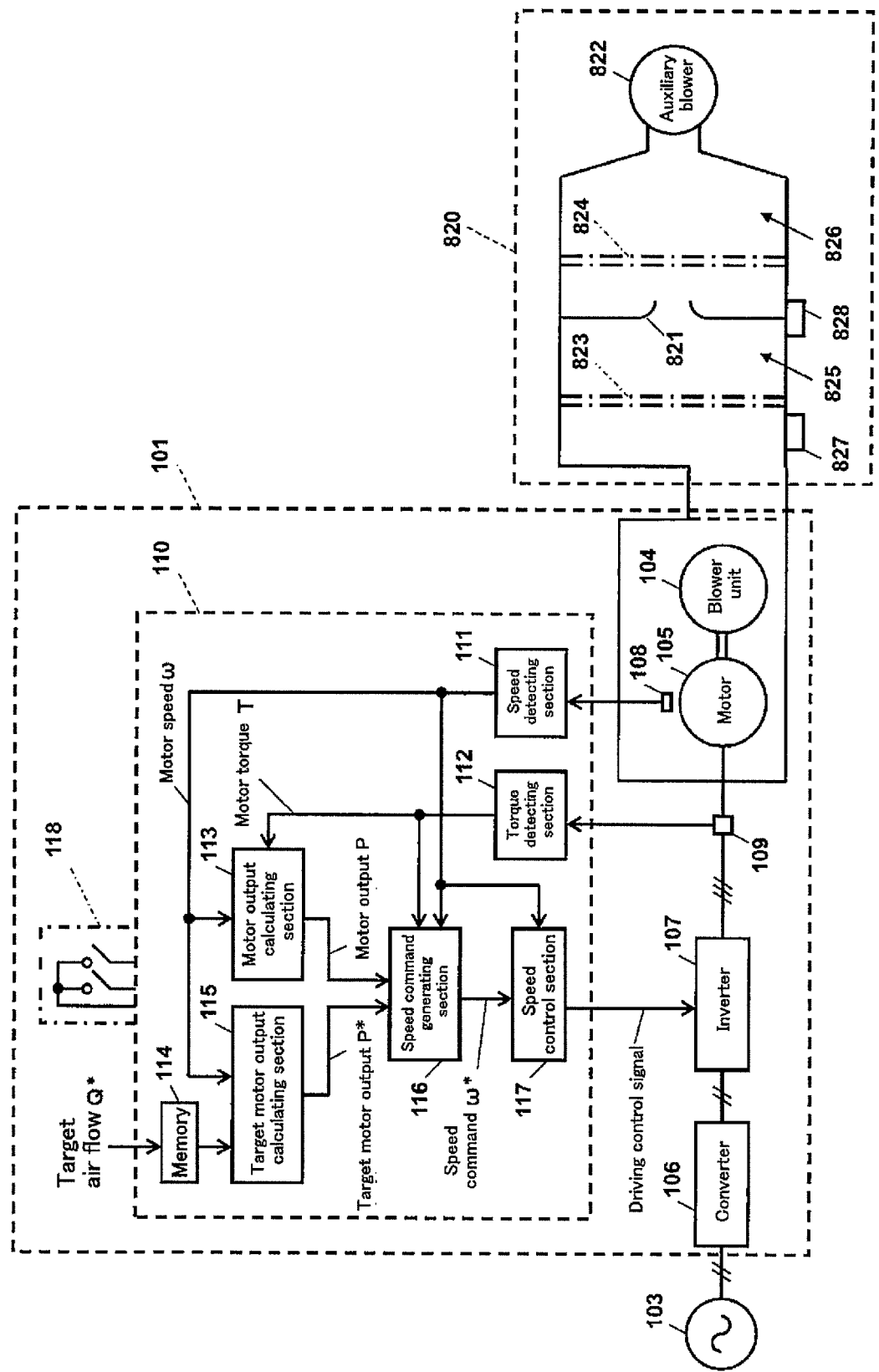
FIG. 11 is a block diagram showing the exemplary configuration for a test operation (running) in a case where the blower coefficients are calculated in the motor control device according to Embodiment 1 of the present invention.

Then, in step S906, the motor control device 810 is shifted from the speed control mode to the constant air flow control mode by the manual operation of the switch 118 or the communication input, and the block configuration for test operation (running) is formed. FIG. 11 is a block diagram showing the exemplary configuration for the test operation (running) in a case where the blower coefficients are calculated in the motor control device according to Embodiment 1 of the present invention. The air conditioning apparatus 101 and the motor control device 110 of FIG. 11 are identical in configuration to those during the constant air flow control of FIG. 1. In other words, the air conditioning apparatus 101 of FIG. 1 is connected to the wind tunnel experiment equipment 820.

In final step S907, several target air flows Q* are input to the motor control device 110, and the test operation (running) in the constant air flow control mode is performed. Then, it is confirmed whether or not the measured air flow correctly coincides with the target air flow Q*.

During the constant air flow control, the target motor output calculating section 115 reads the values of the coefficients $\alpha_n$, $\beta$ from the memory 114, and calculates the target motor output P* by using the values of the coefficients $\alpha_n$, $\beta$. Note that the values of the coefficients $\alpha_n$, $\beta$ need not be always stored in the ROM, but may be transmitted to the motor control device 110 by the communication input from outside. In this case, the received values of the coefficients $\alpha_n$, $\beta$ may be stored in the RAM or the like within the memory 114.

As described above, in accordance with the above described calculation procedure, the values of the blower coefficients can be derived by performing data measurement using a single motor speed. Because of this, it is not necessary to perform the measurement while changing the motor speed unlike the prior art disclosed in Patent Literature 1. This makes it possible to implement the constant air flow control with fewer experiment steps.

The calculation formula of the target motor output P* is not limited to the formula (7). That is, the same advantages as those of the present embodiment can be attained in the calculation of the blower coefficients, so long as the calculation formula is a calculation formula used to calculate the target motor output P* as a product of a polynomial of variables derived by dividing the target air flow Q* by the motor speed $\omega$, and the cube of the motor speed $\omega$. For example, the calculation formula of the target motor output P* may be the following formula (13):

$$P^* = \omega^3 \cdot \sum_{n=0}^{i} \left[ \gamma_n \cdot \left(\frac{Q^*}{\omega}\right)^n \right] = \sum_{n=0}^{i} (\gamma_n \cdot \omega^{3-n} \cdot Q^{*n}) \quad (13)$$

P* indicates the target motor output, $\omega$ indicates the motor speed, Q* indicates the target air flow, i indicates a finite value of integer which is equal to or larger than 0, and $\gamma_n$ indicates the blower coefficient (n=0, 1, 2, . . . , i) representing the blower characteristic which is unique to the blower.

In this case, when $\gamma_n$ in the formula (13) is defined as indicated by the following formula (14), the formula (13) is eventually the same as the formula (6).

$$\gamma_n = \alpha_n \cdot \left(\frac{1}{\beta}\right)^{3-n} \quad (14)$$

Therefore, in this case, also, the value of the blower coefficient $\gamma_n$ can be derived quickly from the coefficient $K_n = \alpha_n$ in the formula (3) which is the regression formula of the measurement data and the motor speed $\omega_s = \beta$ in the measurement. In other words, in this case, also, the value of the blower coefficient which enables the constant air flow control, can be found, by performing the data measurement using one motor speed.

As described above, the motor control device and the control method thereof according to the present embodiment include a means which calculates the target motor output as the product of the polynomial of variables derived by dividing the target air flow by the motor speed, and the cube of the motor speed. In other words, in the motor control device and the control method thereof according to the present embodiment, the constant air flow control is performed by using the target motor output derived uniquely from the target air flow. Therefore, the values of the blower coefficients which are applicable to every motor speed can be derived once the data measurement is performed using one motor speed. This makes it possible to implement the constant air flow control with fewer experiment steps.

Calculation Example 2 of Blower Coefficient

As described above, by obtaining the blower characteristic by the measurement experiment, the values of the blower coefficients $\alpha_n$, $\beta$ can be calculated. However, in some cases, a blower unit having a structure which is similar to that of the blower unit, the values of the coefficients $\alpha_n$, $\beta$ are preliminarily known, the values of the coefficients $\alpha_n$, $\beta$ can be derived without performing the above mentioned measurement experiment. The calculation example of the values of the coefficients $\alpha_n$, $\beta$ in this case will be now described.

Initially, a blower unit A, the values of the blower coefficients $\alpha_n$, $\beta$ are known and a blower unit B, the values of the blower coefficients $\alpha_n$, $\beta$ are unknown, are prepared. Then, the dimension ratio between the blower unit A and the blower unit B is calculated. In the present example, it is supposed that the outer diameter of a bladed wheel of the blower unit B is D times as large as that of the blower unit A. Then, the values of the blower coefficients $\alpha_n$, $\beta$ are found using the relation between the dimension ratio and the shaft power, and the relation between the dimension ratio and the air flow.

In general, in the case of the blower unit, the shaft power is proportional to the fifth power of the outer diameter of the bladed wheel, and the air flow is proportional to the cube of the outer diameter of the bladed wheel. Therefore, the following formulas (15) and (16) are satisfied:

$$\frac{P_B}{P_A} = D^5 \quad (15)$$

$$\frac{Q_B}{Q_A} = D^3 \quad (16)$$

In these formulas, $P_A$ indicates the motor output for driving the blower unit A, $P_B$ indicates the motor output for driving the blower unit B, $Q_A$ indicates the air flow of the blower unit A, $Q_B$ indicates the air flow of the blower unit B, and D indicates the dimension ratio of the outer diameter of the bladed wheel.

The target motor output of the blower unit A is represented by the formula (17):

$$P_A^* = \sum_{n=0}^{i} \left[ \alpha_{An} \cdot \left(\frac{\omega}{\beta}\right)^{3-n} \cdot Q_A^{*n} \right] \quad (17)$$

In this formula, $P_A^*$ indicates the target motor output, $\omega$ indicates the motor speed, $Q_A^*$ indicates the target air flow, and $\alpha_{An}$ (n=0, 1, 2, . . . , i) and $\beta$ indicate constants.

By applying the formula (15) and the formula (16) to the above formula (17), the target motor output $P_B^*$ of the blower unit B can be represented by the formula (18):

$$P_B^* = \sum_{n=0}^{i} \left[ \alpha_{Bn} \cdot \left(\frac{\omega}{\beta}\right)^{3-n} \cdot Q_B^{*n} \right]; \alpha_{Bn} = (D^{5-3n} \cdot \alpha_{An}) \quad (18)$$

In this formula, $P_B^*$ indicates the target motor output, $\omega$ indicates the motor speed, $Q_B^*$ indicates the target air flow, $\alpha_{Bn}$ (n=0, 1, 2, . . . , i) and $\beta$ indicate constants, and D indicates the dimension ratio of the outer diameter of the bladed wheel.

Therefore, by multiplying the known blower coefficient $\alpha_{An}$ by the (5-3n)-th power of the dimension ratio D of the outer diameter of the bladed wheel, the value of the unknown blower coefficient $\alpha_{Bn}$ can be decided. Table 3 illustrated below shows the blower coefficient values of the blower unit B which has the same structure as that of the blower unit A having the blower coefficient values of table 2, and has an outer diameter of bladed wheel which is 1.2 times as large as that of the blower unit A.

TABLE 3

Coefficient values of blower unit which has the same structure as that of blower unit having coefficient values of table 2, and has outer diameter of bladed wheel which is 1.2 times as large as that of blower unit having coefficient values of table 2.

$\alpha_{B2}$ = 7.00E−02
$\alpha_{B1}$ = 3.96E+00
$\alpha_{B0}$ = 2.15E+02
$\beta$ = 73.3 (rad/sec)

As described above, according to the present calculation example of the blower coefficient values, the blower coefficient values can be derived by using the dimension ratio between the blower unit having the known blower coefficient values and the blower unit having the same structure as that of the blower unit having the known blower coefficient values, for the blower unit having the same structure as that of the blower unit having the known blower coefficient values. Therefore, according to the present example, the blower coefficients can be calculated without performing the measurement experiment.

Modified Example of Embodiment 1

Next, the modified example of Embodiment 1 will be described.

Figure 12:
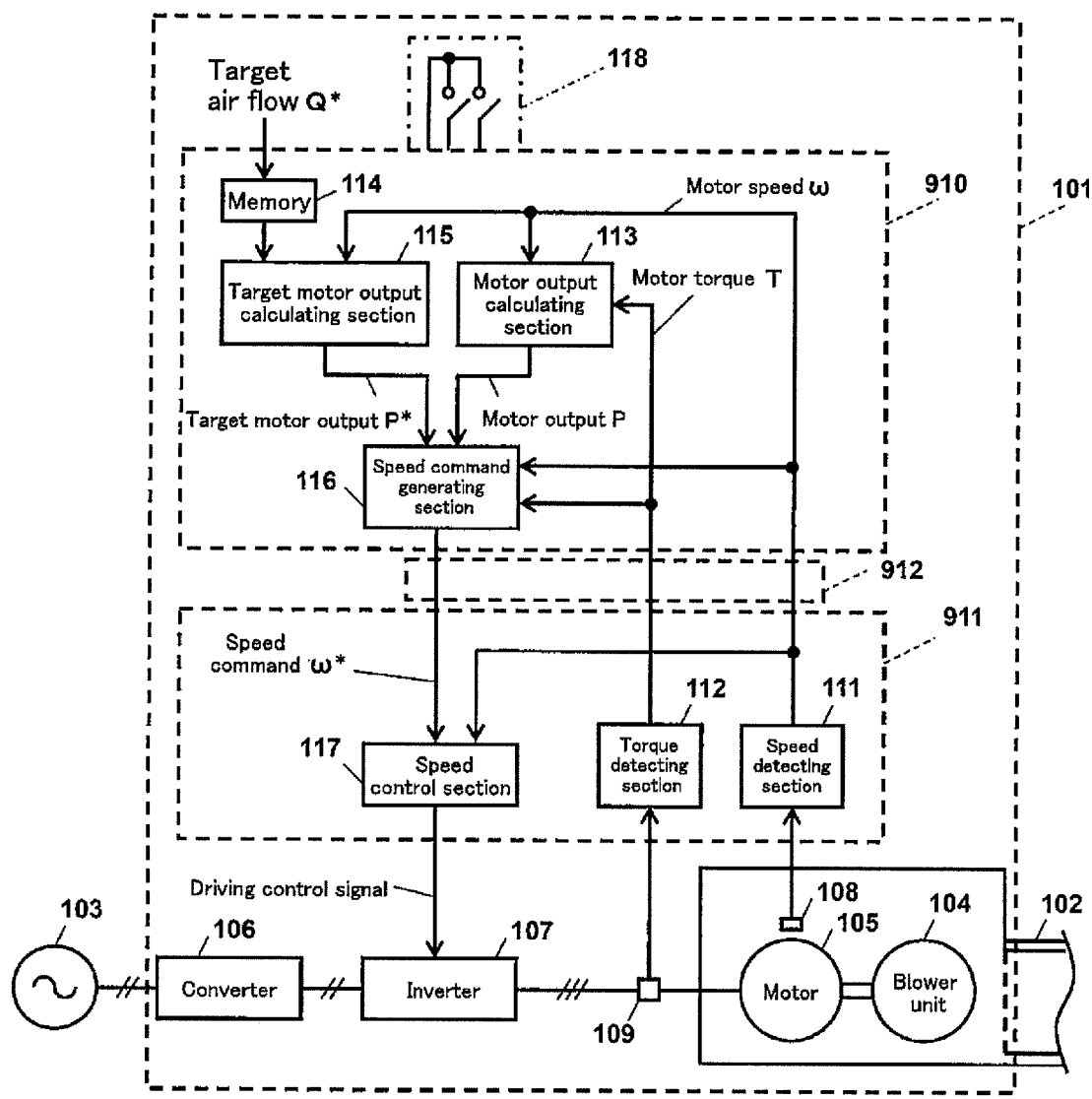
FIG. 12 is a block diagram showing a modified example of the motor control device according to Embodiment 1 of the present invention.

FIG. 12 is a block diagram showing the modified example of the motor control device according to Embodiment 1 of the present invention. In Embodiment 1 of FIG. 1, the speed control section 117, the speed detecting section 111, and the torque detecting section 112 are provided within the motor control device 110 as in the target motor output calculating section 115 and the speed command calculating section 116. In contrast, in the present modified example, the motor control device includes the configuration of FIG. 12 instead of the configuration of FIG. 1.

Specifically, the motor control device according to the present modified example includes a first unit 910 including at least the target motor output calculating section 115 and the speed command calculating section 116, a second unit 911 including at least the speed control section 117, the speed detecting section 111 and the torque detecting section 112, and a communication section 912 which performs the data communication between the first unit 910 and the second unit 911.

As shown in FIG. 12, the first unit 910 and the second unit 911 are allowed to mutually communicate data via the communication section 912 including, for example, a communication cable of RS232C standard, etc. The motor speed ω detected by the speed detecting section 111 of the second unit 911 and the motor torque T detected by torque detecting section 112 of the second unit 911 are sent to the first unit 910 via the communication section 912. The first unit 910 calculates the speed command ω* by using these data, and sends the speed command ω* to the speed control section 117 of the second unit 911 via the communication section 912. The speed control section 117 outputs a driving control signal to the inverter 107 in response to the received speed command ω* and thus controls the speed of the motor 105.

In the above described configuration of the modified example of FIG. 12, the advantages similar to those of Embodiment 1 can be achieved.

Modified Example of Embodiment 2

Figure 13:
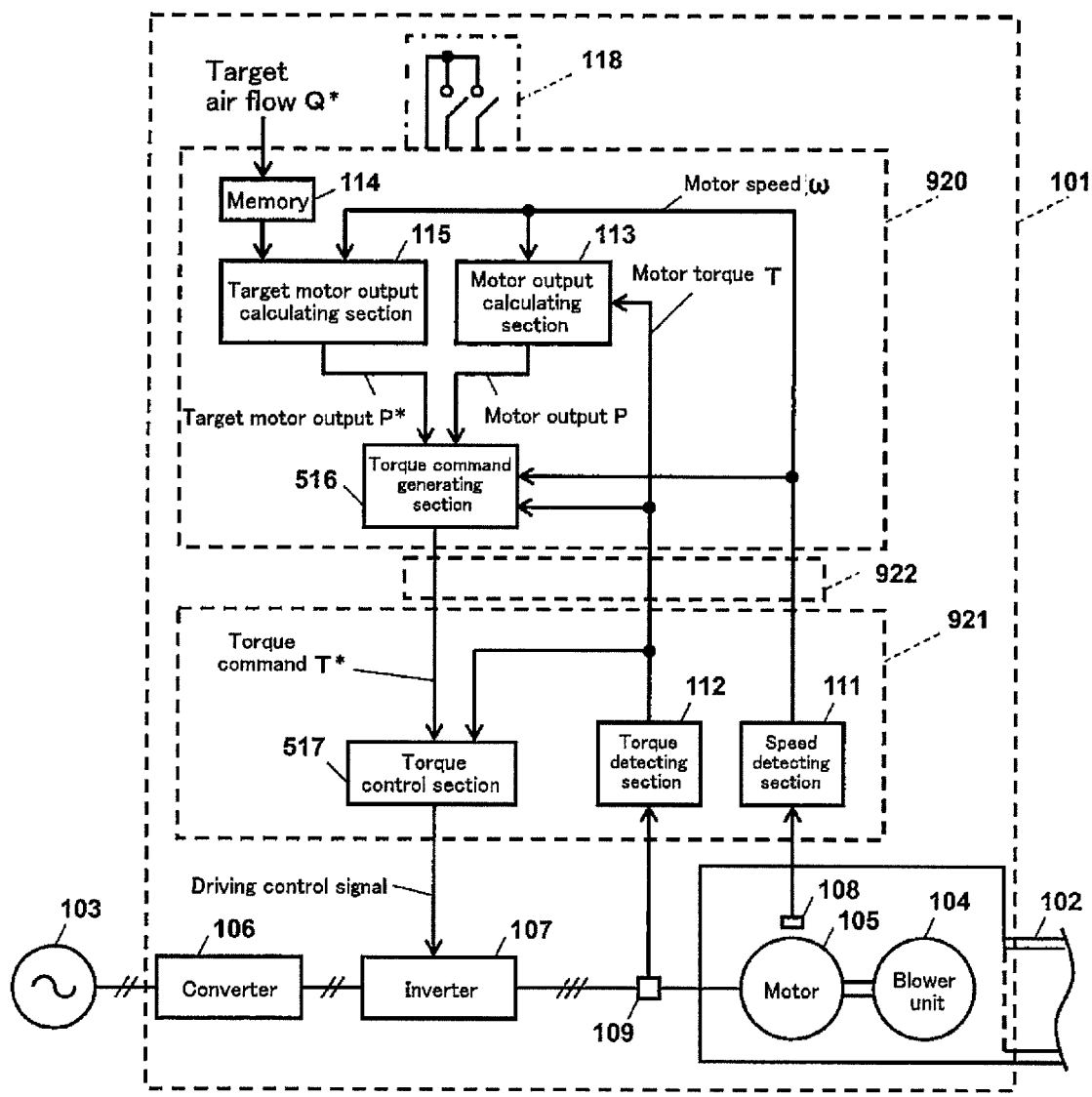
FIG. 13 is a block diagram showing the modified example of the motor control device according to Embodiment 2 of the present invention.

As in the modified example of Embodiment 1, a similar modified example may be applied to Embodiment 2. FIG. 13 is a block diagram showing the modified example of the motor control device according to Embodiment 2 of the present invention. The motor control device according to the present modified example includes a first unit 920 including at least the target motor output calculating section 115 and the torque command generating section 516, a second unit 921 including at least the torque control section 517, the speed detecting section 111 and the torque detecting section 112, and a communication section 922 which performs the data communication between the first unit 920 and the second unit 921.

As shown in FIG. 13, the first unit 920 and the second unit 921 are allowed to mutually communicate data via the communication section 922 including, for example, a communication cable of RS232C standard, etc. The motor speed co detected by the speed detecting section 111 of the second unit 921 and the motor torque T detected by the torque detecting section 112 of the second unit 921 are sent to the first unit 920 via the communication section 922. The first unit 920 calculates the torque command T* by using these data, and sends the torque command T* to the torque control section 517 of the second unit 921 via the communication section 922. The torque control section 517 outputs a driving control signal to the inverter 107 in response to the received speed-torque command T* and thus controls the torque of the motor 105.

In the above described configuration of the modified example of FIG. 13, the advantages similar to those of Embodiment 2 can be achieved.

In the motor control device 110 of Embodiment 1, the control method of the motor is the speed control. Therefore, except for a rapid transient state (i.e., in a stationary state), the motor speed ω is substantially equal to the speed command ω*. Therefore, as the calculation formula of the speed command ω*, the speed command generating section 116 may use the following formula (19) instead of the formula (8), or may use the following formula (20) instead of the formula (9):

$$\omega^* = \left(\frac{P^*}{P}\right)^{\frac{1}{3}} \cdot \omega_{prev}^* \tag{19}$$

In this formula, ω* indicates the speed command, ω*$_{prev}$ indicates the speed command output previously from the speed command generating section 116, P* indicates the target motor output, and P indicates the motor output.

$$\omega^* = \omega + K_G(P^* - P) \tag{20}$$

In this formula, ω* indicates the speed command, ω indicates the motor speed, $K_G$ indicates a control gain (positive constant), P* indicates the target motor output, and P indicates the motor output.

In the motor control device 510 of Embodiment 2, the control method of the motor is the torque control. Therefore, except for a rapid transient state (i.e., in a stationary state), the motor torque T is substantially equal to the torque command T*. Therefore, as the calculation formula of the torque command T*, the torque command generating section 516 may use the following formula (21) instead of the formula (10), or may use the following formula (22) instead of the formula (11):

$$T^* = \left(\frac{P^*}{P}\right)^{\frac{2}{3}} \cdot T_{prev}^* \tag{21}$$

In this formula, T* indicates the torque command, T*$_{prev}$ indicates the torque command output previously from the torque command generating section 516, P* indicates the target motor output, and P indicates the motor output.

$$T^* = T + K_{GT}(P^* - P) \tag{22}$$

In this formula, T* indicates the torque command, T indicates the motor torque, $K_{GT}$ indicates a control gain (positive constant), P* indicates the target motor output, and P indicates the motor output.

Although an example in which the blower apparatus including the motor control device of the present invention is applied to general home has been described above, it may be applied to, for example, constructions for business purposes or commercial uses, such as buildings, air conditioning equipment for business purpose such as a clean room, and mobile objects such as cars, buses, railway vehicles, aircraft, marine vessels, etc.

Numeral improvements and alternative embodiments of the present invention will be conceived by those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

INDUSTRIAL APPLICABILITY

The present invention is effectively applied to a motor control device which performs constant air flow control, irrespective of a change in a pressure loss condition or a change in a static pressure, and is useful as air conditioning equipment of general homes, constructions for business purposes, constructions for commercial uses, vehicle, etc.

What is claimed is:

1. A motor control device which controls a motor for driving a blower unit to supply an air flow at a constant target flow rate under variable flow conditions, comprising:
a motor output calculating section configured to calculate a motor output from a motor speed and a motor torque;

a target motor output calculating section configured to calculate a target motor output which is defined by a first function involving the target air flow and the motor speed, wherein the first function involves a cubic of the motor speed multiplied by a polynomial in which each term of the polynomial includes a variable that is a division of the target air flow by the motor speed, and each term of the polynomial includes a coefficient empirically determined in advance under a single motor speed condition; and an operation command generating section configured to generate an operation command for directing either a target speed or a target torque of the motor such that the calculated motor output will approach the target motor output, wherein the operation command is defined by a second function involving either the motor speed or motor torque modified by a degree of deviation of the calculated motor output from the target motor output;

wherein the target motor output calculating section is configured to repeatedly calculate the target motor output from the motor speed and the motor torque, and the operation command generating section is configured to repeatedly generate the operation command using the target motor output calculated by the target motor output calculating section to progressively bring the air flow supplied by the blower unit close to the target air flow.

2. The motor control device according to claim 1, wherein the first function is expressed by the following equation:

$$P^* = \sum_{n=0}^{i} \left[ \alpha_n \cdot \left(\frac{\omega}{\beta}\right)^{3-n} \cdot Q^{*n} \right]$$

where P* indicates the target motor output, ω indicates the detected motor speed, Q* indicates the target air flow, i indicates a finite value of integer which is equal to or larger than 0, and $\alpha_n$ (n=0, 1, 2, ..., i) and β indicate constants, respectively.

3. The motor control device according to claim 1, comprising a motor speed/torque detection section configured to output a first detection signal indicating the motor speed and a second detection signal indicating the motor torque.

4. The motor control device according to claim 1, wherein the operation command generating section is configured to generate the operation command for directing the target speed of the motor.

5. The motor control device according to claim 4, wherein the second function includes the motor speed multiplied by a cubic root of a ratio of the target motor output with respect to the calculated motor output.

6. The motor control device according to claim 4, wherein the second function includes the motor speed added with a product of a gain and a difference between the calculated motor output and the target motor output.

7. The motor control device according to claim 1, wherein the operation command generating section is configured to generate the operation command for directing the target torque of the motor.

8. The motor control device according to claim 7, wherein the second function includes the motor torque multiplied by a (⅔)-th power of a ratio of the target motor output with respect to the calculated motor output.

9. The motor control device according to claim 7, wherein the second function includes the motor torque added with a product of a gain and a difference between the calculated motor output and the target motor output.

10. The motor control device according to claim 1, wherein the operation command generating section is configured to generate the operation command by integrating a difference between the calculated motor output and the target motor output.

11. A method of controlling a motor for driving a blower unit to supply an air flow at a constant target air flow, the method comprising:

calculating a motor output from a motor speed and a motor torque;

calculating a target motor output which is defined by a first function involving the target air flow and the motor speed, wherein the first function includes the motor speed raised to a third power multiplied by a polynomial in which each term of the polynomial includes a variable that is a division of the target air flow by the motor speed, and each term of the polynomial includes a coefficient empirically determined in advance tinder a single motor speed condition; and generating an operation command for directing either a target speed or a target torque of the motor such that the calculated motor output will approach the target motor output, wherein the operation command is defined by a second function involving either the motor speed or the motor torque modified by a degree of deviation of the calculated motor output from the target motor output;

wherein calculating a motor output from a motor speed and a motor torque comprises repeatedly calculating the motor output from the motor speed and the motor torque, generating an operation command comprises repeatedly generating the operation command using the target motor output to progressively bring the air flow supplied by the blower unit close to the target air flow.

12. The method of controlling the motor according to claim 11, wherein the first function is expressed by the following equation:

$$P^* = \sum_{n=0}^{i} \left[ \alpha_n \cdot \left(\frac{\omega}{\beta}\right)^{3-n} \cdot Q^{*n} \right]$$

where P* indicates the target motor output, ω indicates the motor speed, Q* indicates the target air flow, i indicates a finite value of integer which is equal to or larger than 0, and $\alpha_n$ (n=0, 1, 2, ..., i) and β indicate constants, respectively.

13. The method of controlling the motor according to claim 12, comprising:

measuring the motor output and the air flow under a variety of air flow conditions while driving the motor at a single motor speed to obtain pairs of motor output and air flow measurements, each pair of measurements being representative of the motor output and the air flow measured under a different air flow condition;

providing a regression equation expressed as follows:

$$Ps = \sum_{n=0}^{i} (K_n \cdot Q_s^n)$$

Where Ps represents a motor output Qs represents an air flow; Ku represents coefficients for terms of the regression equation (n=0, 1, 2, . . . , i); and i represents a finite value of integer which is equal to or larger than 0;

solving the regression equations each having the motor output Ps and the air flow $Q_s^n$ set equal to a different pair of motor output and air flow measurements to solve for the coefficients Ku of the regression equation;

setting constants $\alpha_n$ equal, respectively, to the coefficients Ku multiplied by a factor; and setting the constant $\beta$ equal to the single motor speed.

14. The method of controlling the motor according to claim 13, wherein the factor is 1.

15. The method of controlling the motor according to claim 13, wherein the factor is a dimension of the blower unit raised to an integer power.

16. The method of controlling the motor according to claim 11, further comprising receiving a first detection signal indicating the motor speed and a second detection signal indicating the motor torque.

17. The method of controlling the motor according to claim 11, where generating an operation command comprises generating the operation command for directing the target speed of the motor.

18. The method of controlling the motor according to claim 17, wherein the second function includes the motor speed multiplied by a cubic root of a ratio of the target motor output with respect to the calculated motor output.

19. The method of controlling the motor according to claim 17, wherein the second function includes the motor speed added with a product of a gain and a difference between the calculated motor output and the target motor output.

20. The method of controlling the motor according to claim 11, wherein generating an operation command comprises generating the operation command for directing the target torque of the motor.

21. The method of controlling the motor according to claim 20, wherein the second function includes the motor torque multiplied by (⅔)-th power of a ratio of the target motor output with respect to the calculated motor output.

22. The method of controlling the motor according to claim 20, wherein the second function includes the motor torque added with a product of a gain and a difference between the calculated motor output and the target motor output.

23. The method of controlling the motor according to claim 11, wherein generating an operation command comprises generating the operation command by integrating a difference between the calculated motor output and the target motor output.

24. A blower apparatus including a blower unit; a motor which drives the blower unit and a motor control device which controls the motor to drive the blower unit to supply an air flow at a constant target flow rate under variable flow conditions, the motor control device comprising:

a motor output calculating section configured to calculate a motor output from a motor speed and a motor torque;

a target motor output calculating section configured to calculate a target motor output which is defined by a first function involving the target air flow and the motor speed, wherein the first function involves a cube of the motor speed multiplied by a polynomial in which each term of the polynomial includes a variable that is a division of the target air flow by the motor speed, and each term of the polynomial includes a coefficient empirically determined in advance under a single motor speed condition;

a speed command generating section configured to generate a speed command for directing a target motor speed such that the calculated motor output will approach the target motor output, wherein the speed command is defined by a second function involving the motor speed modified by a degree of deviation of the calculated motor output from the target motor output; and a speed control section configured to compare the motor speed and the target motor speed of the speed command and generate a motor control signal that brings the motor speed close to the target motor speed of the speed command;

wherein the target motor output calculating section is configured to repeatedly calculate the target motor output from the motor speed and the motor torque, and the speed command generating section is configured to repeatedly generate the speed command using the target motor output calculated by the target motor output calculating section to progressively bring the air flow supplied by the blower unit close to the target air flow.

25. A blower apparatus including a blower unit; a motor which drives the blower unit; and a motor control device which controls the motor to drive the blower unit to supply an air flow at a constant target flow rate under variable flow conditions, the motor control device comprising:

a motor output calculating section configured to calculate a motor output from a motor speed and a motor torque;

a target motor output calculating section configured to calculate a target motor output which is defined by a first function involving the target air flow and the motor speed, wherein the first function involves a cube of the motor speed multiplied by a polynomial in which each term of the polynomial includes a variable that is a division of the target air flow by the motor speed, and each term of the polynomial includes a coefficient empirically determined in advance under a single motor speed condition;

a torque command generating section configured to generate a torque command for directing a target motor torque such that the calculated motor output will approach the target motor output, wherein the torque command is defined by a second function involving the motor torque modified by a degree of deviation of the calculated motor output from the target motor output; and a torque control section configured to compare the motor torque and the target motor torque of the torque command and generate a motor control signal that brings the motor torque close to the target torque of the torque command, wherein the target motor output calculating section is configured to repeatedly calculate the target motor output from the motor speed and the motor torque, and the torque command generating section is configured to repeatedly generate the torque command using the target motor output calculated by the target motor output calculating section to progressively bring the air flow supplied by the lower unit close to the target air flow.

26. A method for generating a target motor output that controls a motor to drive a blower unit to supply an air flow t a constant target flow rate under variable flow conditions, comprising:

measuring a motor output and an air flow under a variety of air flow conditions while driving the motor at a single motor speed to obtain pairs of motor output and air flow measurements, each pair of measurements, being representative of the motor output and the air flow measured under a different air flow condition;

providing a regression equation expressed as follows:

$$Ps = \sum_{n=0}^{i} (K_n \cdot Q_s^n)$$

Where Ps represents a motor output; Qs represents an air flow; $K_n$ represents coefficients for terms of the regression equation (n=0, 1, 2, . . . , i); and i represents a finite value of integer which is equal to or larger than 0;

solving the regression equations each having the motor output Ps and the air flow $Q_s''$ set equal to a different pair of motor output and air flow measurements to solve for the coefficients $K_n$ of the regression equation;

providing a polynomial equation expressed as follows:

$$P^* = \sum_{n=0}^{i} \left[ \alpha_n \cdot \left(\frac{\omega}{\beta}\right)^{3-n} \cdot Q^{*n} \right]$$

where P* indicates the target motor output, ω indicates the motor speed, Q* indicates the target air flow, i indicates a finite value of integer which is equal to or larger than 0, and $\alpha_n$ (n=0, 1, 2, . . . , i) and β indicate constants, respectively;

setting constants $\alpha_n$ equal, respectively, to the coefficients $K_n$;

setting the constant β equal to the single motor speed; and solving the polynomial equation with a detected motor speed and a target air flow to derive the target motor output.

* * * * *